United States Patent [19]

Cecil et al.

[11] Patent Number: 5,220,145
[45] Date of Patent: Jun. 15, 1993

[54] AUTOMATIC WELDER CONTROL SYSTEM

[76] Inventors: Dimitrios G. Cecil, 1277 Ashover Dr., Bloomfield Hills, Mich. 48304; William E. Mumford, 2517 Gay La., Lansing, Mich. 48912-4405; Yajie Chen, 469 W. Forest, Apt. #3, Detroit, Mich. 48201

[21] Appl. No.: 707,364
[22] Filed: May 29, 1991
[51] Int. Cl.$^5$ ............................................. B23K 11/25
[52] U.S. Cl. .................................... 219/110; 219/89; 219/86.9
[58] Field of Search ...................... 219/109, 110, 91.1, 219/86.9, 88, 89

[56] References Cited

U.S. PATENT DOCUMENTS

| | | | |
|---|---|---|---|
| 4,028,522 | 6/1977 | Chihoski et al. | 219/109 |
| 4,352,971 | 10/1982 | Slade | 219/89 |
| 4,419,558 | 12/1983 | Stiebel . | |
| 4,447,700 | 5/1984 | Cohen | 219/110 |
| 4,461,944 | 7/1984 | Cohen | 219/110 |
| 4,542,277 | 9/1985 | Cecil | 219/109 |
| 4,684,778 | 8/1987 | Cecil | 219/89 |
| 4,841,113 | 6/1989 | Hamada et al. | 219/110 |
| 4,861,959 | 8/1989 | Cecil | 219/89 |

OTHER PUBLICATIONS

American Welding Society Presents The International Conference on Computerization Of Welding Information IV; Nov. 3-6, 1992; Supplement to the Welding Journal.

American Welding Society, Detroit Section, "Annual Student and Scholar Night!" Welding Education & Research at Rensselaer: The Next Chapter; By Dr. Robert W. Messler, Jr.

Controlling Resistance Welds With Deflection Feedback; By David Bacon, Square D. Company; Dated Sep. 11, 1991.

Modeling Of Resistance Spot Weld Nugget Growth, By C. L. Tsai, O. A. Jammal, J. C. Papritan and D. W. Dickinson; Presented at 71st AWS Annual Meeting, Apr. 22-27, 1990.

Analysis and Development of a Real-Time Control Methodology in Resistance Spot Welding By C. L. Tsai, W. L. Dai, D. W. Dickinson and J. C. Papritan; pp. 339s-351s.

SAE Technical Paper Series No. 910191, Analysis and Development of A Real-Time Control Methodology in Resistance Spot Welding, By C. L. Tsai, W. L. Dai and D. Dickinson.

SAE Technical Paper Series No. 860579, Monitoring and Control of Spot Weld Operations By A. Stiebel, C. Ulmer, D. Kodrack and B. B. Holmes, Dated Feb. 24-28, 1986.

Detroit Section, Sheet Metal Welding Conference, Dated Oct. 7, 8, 9, 1992, Fairlane Holiday Inn, Detroit, Mich., Reservation Application, 3 pages.

Detroit Section, Sheet Metal Welding Conference, Dated Oct. 7, 8, 9, 1992, Fairlane Holiday Inn, Detroit, Mich., Program, 4 pages.

Resistance Spot Welding Feedback Control Based On Electrode Indentation, By: A. Stiebel, Vice President, GSG, Inc., K. C. Wu, Senior Scientist, Square D. Company/Pertron A Computer Integrated Flexible Robotic Resistance Welding Cell, By: D. James Cecil, William E. Mumford, Computer Integrated Welding, Inc., pp. 493-495.

Primary Examiner—Clifford C. Shaw
Attorney, Agent, or Firm—Brooks & Kushman

[57] ABSTRACT

The present invention provides a weld control monitoring system which determines the quality of the welds in real time, and provides responsive useful outputs indicating the quality of the weld. The system permits the user to input weld data as well as quality specifications which the part must meet in order to continue the production run. A monitoring system can be used with or without programmable logic controllers and includes special program for estimating the tip wear of the welding electrodes. The present invention also includes a weld gun control in which additional support for the weld gun electrode is provided by adjacent rail structures which permit displacable movement of the electrode mounted to linear displacement welding cylinder. A sensor coupled to the piston rod of the weld cylinder provides linearly variable displacement transducer signals for use in monitoring portion of the apparatus. The monitoring apparatus also provide statistics of individual and groups of parts produced with the welding apparatus.

13 Claims, 52 Drawing Sheets

FIG. 6 COMPUTER MODE 1 (MODE 1) WITH PLC OPERATION

FIG. 21

C.I.W.™
Computer Integrated Welding
Version 4.5 - 1 Gun System - 30 Cycles

Serial Number: 28320

This program will analyze weld quality in real time, based on data provided by user on "weld gun data" and "quality specification". It can work with and without a programmable logic controller. It will estimate tip wear continuously. It also provides statistics on the quality of welding and number of welds per part.

press <enter> or button to continue / press <esc> to exit

FIG. 25

Computer Integrated Welding, Inc.
C.I.W.™ System Analysis (C)

| Printer |
| Parameters |
| PLC |
| Trigger Board |
| Sensor mount |
| I/O Board |
| A/D Board |

All systems Operational
press <enter> or button to continue
Proceeding with Auto - Calibration

FIG. 26

DATE: 05-20-91  TIME: 13:23:30
Sensor is Re-zerod @ -92
ERROR: Calibrated with balance weight strip!

Computer Integrated Welding, Inc.

Performing Calibration

*** Advance Gun to Turbine to Zero Sensor ***

ERROR: Calibrated with balance weight strip!
Please check and clear the strip on turbine and weld gun
Then push calibrate button and calibrate again!

Sensor is Re-zerod @ -92

Check turbine in welding station without balance strip or welded spot with
machine set in "MANUAL" and "WELD MONITOR" switch set to off.
Press alarm reset/calibrate button or keyboard letter "Y" to indicate new tip
within 10 seconds, otherwise system assumes old tip.
Advance slide, slide lock, advance gun; return gun, slide lock, slide.
New tip? (Y/N)--NEW TIP!

FIG. 27

C.I.W.™
Computer Integrated Welding
Version 4.5 - 1 Gun System - 30 Cycles

MAIN MENU IN MODE 2

F1 - C.I.W.™ GLOSSARY　　F2 - CALIBRATE SENSORS

F3 - SYSTEM ANALYSIS　　F4 - WELD SCHEDULE DATA

F5 - WELD SUMMARY　　F6 - WELD GUN DATA

F7 - DIGITAL VOLTMETER　　F8 - VOLTAGE & MEASUREMENT

F9 - WELD ANALYSIS MENU　　F10 - QUALITY SPECIFICATION

FIG. 29

C.I.W.™ Weld Schedule Data
Updated: 05-20-1991   13:42:03

| | |
|---|---|
| Vane weld nugget disp. | .0005 |
| Vane weld limit | .001 |
| Initial squeeze time | 45 at 60 PSI AIR |
| Squeeze time | 0 Transformer tap set # 2 high |
| Slope on/off | 0 |
| Upslope time | 0 |
| Initial % heat | 0 |
| Weld #1 (heat time) | 11 |
| Weld #1 %heat | 63 |
| Weld #2 (heat time) | 11 |
| Weld #2 %heat | 63 |
| Downslope time | 0 |
| Final % heat | 0 |
| Hold time | 20 |
| Off time | 0 refer to F6 screen |
| Repeat / single | Off |

| F6 - Return to menu | F8 - Hardcopy | F10 - Save data |

FIG. 30

C.I.W.™ Weld Gun Data
Updated: 05-20-1991  13:43:25

| | |
|---|---|
| Company name | :General motors Hydramatic Div., Flint plant 84 |
| Tooling number | :May 21, 1990 |
| Part number | :298 turbine assy |
| Gun number | :CIW ECG-795-125-00-00E |
| Sensor unit number | :CIW #2228 16.634 v |
| Welds made | :16483 |
| Part designation | :Balance weld weight |
| Material type | :crs .041 |
| Material thickness | :.038 |
| Tolerance=/- | :.01 |
| Weld controller | :CIW L-814 board interface to any weld control |
| Weld schedule No. | :refer to F4 screen |
| Tip installed | :05-09-1991  11:03:46 |
| Print weld (on/off) | :OFF |
| Calibration count | :-90 |
| Penetration delay limit | :3 |
| Alarm:penetration delay % | :20 |

Total weld cycles    16,505

F6 - Return to menu    F8 - Hardcopy    F10 - Save data

FIG. 31

```
C.I.W.™ Quality Control Data (C)
     Updated: 05-20-1991  13:44:36

Sensor channel # . . . . . . . . . . . . . . . . .  2
Trigger channel# . . . . . . . . . . . . . . . . .  3
Nugget disp. limit . . . . . . . . . . . . . . . . .004
Trigger critical volt . . . . . . . . . . . . . .  7.0
Tip wear limit . . . . . . . . . . . . . . . . . . .050
Conversion factor . . . . . . . . . . . . . . . 16.634
Min. expul. limit . . . . . . . . . . . . . . . . .009
Min. edge limit . . . . . . . . . . . . . . . . . .011
Gun home position . . . . . . . . . . . . . . . .  8.5
Gun home tolerance . . . . . . . . . . . . . . . .05
Alarm, succ. G&Expul.# . . . . . . . . . . . . .  200
Alarm, succ. bad weld # . . . . . . . . . . . . .  3
Alarm, succ. over toler. . . . . . . . . . . . .  200
Alarm, succ. under toler. . . . . . . . . . . . . 200
Alarm, under displacement # . . . . . . . . . . . 200
Alarm, edge weld # . . . . . . . . . . . . . . .  200
Gun home time out . . . . . . . . . . . . . . . 3000 on AT286 10 MHz, 5000=13 seconds

F6 - Return to menu    F8 - Hardcopy    F10 - Save data
```

FIG. 32

Computer Integrated Welding, Inc.
C.I.W.™ Digital Voltmeter (C)

Sensor                     Trigger

| Voltage : | Voltage : |
| 8.6468    | 8.8178    |
|           | Average:  |
|           | 8.8152    |
| Sample count : | Sample count : |
| 1770      | 1805      |

Sensor OK

Press <Esc> to return to menu

FIG. 33

C.I.W.™ Voltage & Measurement (C)

| | | | | |
|---|---|---|---|---|
| 1 Voltage : -0.4641 | Count : -95 | Measurement -.0044 |
| 2 Voltage : -0.4592 | Count : -94 | Measurement -.0041 |
| 3 Voltage : -0.4592 | Count : -94 | Measurement -.0041 |
| 4 Voltage : 0.7621 | Count : 156 | Measurement 0.0693 |
| 5 Voltage : 0.1466 | Count : 30 | Measurement 0.0323 |

C.I.W.™ Voltage & Measurement (C)

| Voltage : 0.1466 | Measurement : 0.0323 In. |
|---|---|
| Sample count : 30 | |

Upper electrode

Lower electrode

<Esc> to return to menu

FIG. 34

Computer Integrated Welding, Inc.
Analysis Menu in Mode 2

<Esc> for Menu

F1 - Weld analysis replay

F2 - Recalibrate / tip wear

F3 - Hardcopy weld-print

F4 - Ready for weld

FIG. 35

Computer Integrated Welding, Inc.
Replay Welding Analysis Updated 10-16-90

The data is saved on files based on date, time, sequence number

F1 - Statistic daily quality

F2 - Display the graph by date and time

F3 - Display the graph by date and sequence number

F4 - Exit

FIG. 36

Computer Integrated Welding Systems (C)
Non-passing welds summary

Part counter 2    Part #: 298 Turbine Assy    Weld # 16485
Date: 05-20-1991              Time: 12:55:39
      Weld #      Displacement      FIT_UP 0 out of 0 welds were unsatisfactory
         PASSING weld percentage: 0.00%
                  ——— Daily Summary ———

Total part number: 2    Reject part: 2      100.0 %
Total welds: 2             Good weld: 0       0.0 %
Total good weld with expul.: 0                0.0 %
Total edge welds: 0                           0.0 %
Total under disp.: 0                          0.0 %
Total below tolerance: 0                      0.0 %
Total above tolerance: 2                    100.0 %
Total part with 0 weld: 0                     0.0 %
Total part with 1 weld: 2                   100.0 %
Total part with 2 weld: 0                     0.0 %
                  F10 - Print

FIG. 37

Computer Integrated Welding, Inc.

Report of the quality between 07-16-90 and 07-20-90                Quality

| Part # | Time | Weld# |
|---|---|---|
| 287 | 12:39:25 | |

| G Weld | Gw/Expu. | Bad Weld | Undisp. | Below | Above | Edge Weld |
|---|---|---|---|---|---|---|
| 2352 | 102 | 1156 | 18 | 75 | 0 | 46 |

<ENTER> -- GRAPH          <ESC> -- ESCAPE

PART OF 0 WELD:         350      14.4%
PART OF 1 WELD:         640      26.4%
PART OF 2 WELD:        1434      59.2%
TOTAL NUMBER OF PARTS   2424
PASSING PART:  1211   50.0%   TOTAL WELD: 3508   PASS: 67.0%

|  | MAX | MIN | MEAN | STD. DEV |
|---|---|---|---|---|
| FIT-UP: | 0.0458 | 0.0194 | 0.0336 | 0.0028 |
| DISP : | 0.0200 | 0.0032 | 0.0084 | 0.0020 |

PRESS <ENTER> TO RETURN, <PRINT SCREEN> TO PRINT

FIG. 38

```
Computer Integrated Welding, Inc.
Replay welding analysis updated 07-05-90
The data is saved on files based on date, time, sequence number
         report of the quality in 06-27-90

Quality
Part #  Time     Weld#
  4    16:21:40

G Weld Gw/Expu. Bad Weld Undisp. Below Above Edge Weld
  0      0        5        0       0     5      0
<ENTER> -- GRAPH          <ESC> -- ESCAPE
PART OF 0 WELD:            0            0.0%
PART OF 1 WELD:            3           75.0%
PART OF 2 WELD             1           25.0%

PASSING PART:  0    0.0%    TOTAL WELD: 5   PASS: 0.0%
       MAX         MIN         MEAN        STD. DEV
FIT-UP: 0.3308    0.2150      0.2426       0.0442
DISP :  0.0171   -.0079       0.0039       0.0083
     PRESS <ENTER> TO RETURN, <PRINT SCREEN> TO PRINT
```

FIG. 39

C. I. W.™ Glossary (C)   page 1 of 4

A word about C. I. W.™

The C. I. W.™ Computer Integrated Welding package by Computer Integrated Welding is the process of analyzing the resistance weld phenomenon in real time. By determining the characteristics of a weld the instant it takes place, we can then determine the quality of the weld nugget.

Initial:     The thickness of the metal before weld power is applied (@ 0 cycles)

Penetration:     The inward stroke of the electrode when weld power is on.

Expansion:     The weld nugget growth, driving the electrode to move outward from its previous position when weld power is on.

Final:     The measurement taken as weld power ends and hold time starts

Displacement: The actual change of the weld nugget from the maximum of expansion to the maximum of penetration.

Page Dn - Page 2      <Esc> - Return to Menu

FIG. 40

C. I. W.™ Glossary (C)  page 2 of 4

F2 - Calibrate Sensor(s)

The utility is used to calibrate or zero the gun mounted sensor interface. By simply closing the gun, with weld power off, the computer will take a reading and automatically calibrate all sensors that are running on the system.

F3 - System Analysis

Upon initial start up and at the request of the user, the C.I.W.™ system will perform a system check to verify that everything is operational. (see system start up for a detailed description)

F4 - Weld Schedule

The weld schedule utility is provided for the user to store the current weld schedule being used for later reference. A hardcopy may be made of the schedule along with the current date.

Page Up - Page 1     Page Dn - Page 3     <Esc> - Return to Menu

FIG. 41

C. I. W.™ Glossary (C)    page 3 of 4

F5 - Weld Summary

By selecting F5 from the Main Menu, the system will print a summation of the welds that have been made. The printout will include all non-passing welds by weld number on the last part with the displacement and fit-up measurement. The passing weld percentage is presented along with weld totals, and analysis of number of welds per part.

F6 - Weld Gun Data

This utility is used to set the parameters for which the C.I.W.™ will operate. The user will specify the material thickness and tolerance, etc.

F7 - Digital Voltmeter

The voltmeter utility is used to determine the voltage being read from the sensor and trigger at any given time. Using this information, it can be determined if the sensor has been moved from its' calibrated position, or if any damage has occurred to the system wiring.

Page Up - Page 2     Page Dn - Page 4     <Esc> - Return to Menu

FIG. 42

C. I. W.™ Glossary (C)    page 4 of 4

F8 - Voltage & Measurement

This utility demonstrates the use of the C.I.W.™ package as a precision measurement tool. Once calibrated, the E.C.G. welding gun can measure thickness with accuracy of +/- 0.0005 inches.

F9 - C.I.W.™ Weld Analysis

After a weld has been made the C.I.W.™ will graph the movement of the electrode tips vs. time, weld-print, and display the following critical data: Initial measurement at the time that the weld power begins, the thickness at the maximum of penetration, the maximum of expansion, and the final measurement at the end of weld power. Along with this data is the cycle time at which each occurs and a determination of the quality of each weld.

Page Up - Page 3                               <Esc> - Return to Menu

FIG. 43

COMPUTER INTEGRATED WELDING, INC.

GUN STUCK!

PRESS <ESC> TO GO TO MAIN MENU OR RESET ALARM TO CONTINUE

FIG. 44

FITUP ERROR! AT 13:30:36 DATE: 05-20-1991
FITUP IS 0.1492 INCH DOUBLE BALANCE WEIGHT STRIP!

COMPUTER INTEGRATED WELDING, INC.

DOUBLE BALANCE WEIGHT STRIP!
PART COUNTER: 1
FITUP IS 0.14919 INCH

GO TO PLC MANUAL MODE, REMOVE PART FROM BALANCE STATION
THEN START AUTOMATIC SEQUENCE AGAIN

PRESS BUTTON OR START NEW PART TO RESET ALARM

TRIGGER CIRCUIT

AUTOMATIC WELDER CONTROL SYSTEM

TECHNICAL FIELD

The present invention relates generally to methods and apparatus for performing welding operations, and more particularly to such apparatus having weld quality detection sensors provide responsive outputs as well as input controls for operation of the welder.

BACKGROUND ART

Previously known welding apparatus have been adapted to sense weld quality. U.S. Pat. Nos. 4,542,277, 4,684,778 and 4,861,959 to Dimitrios G. Cecil disclose a welding apparatus in which linear displacement of the electrodes provides position or condition signals for transfer to indicator devices. However, such apparatus have limited utility to the extent that they do not identify particular conditions before welding operation takes place. In addition, the known apparatus require constant monitoring by a user in order to ascertain the results of each welding step.

TECHNICAL PROBLEM RESOLVED

The present invention overcomes the above-mentioned disadvantages by providing a control system operative in response to linear displacement of at least one welding electrode in order to control and report upon individual and collective welding operation results. The user determines weld gun data and quality specifications to be used during the welding operation. The present invention permits fit up of the metal before welder current is applied to the electrode. For example, linear displacement of the electrode can be used to determine whether a workpiece has been provided for welding, whether a workpiece to be attached is positioned on the workpiece, and whether more than one attachment is positioned for attachment to the workpiece. Moreover, the system provides a report as to whether a good weld has been made in real time, whether any expulsion has occurred around the weld, whether the weld has been made on a reinforced or unreinforced portion of the workpiece, whether penetration has been delayed after application of the welding current and whether the weld has occurred at an edge rather than on the attachment to be attached to the workpiece. Furthermore, the system detects whether an electrode has been stuck to the attachment or the workpiece after the welding operation has been terminated.

The present invention also provides a calibration feature for a desired position of the welding electrode tip. In addition, electrode tip wear is estimated or calibrated and collected for retrieval as desired. Moreover, the system of the present invention automatically compensates for tip wear through the operation of a production welding run.

These and other features of the present invention will be better understood by reference to the following detailed description of the preferred embodiment of the present invention. Although a particular welding operation is described it will be understood that the present invention is not so limited and that a person of ordinary skill in the art would find it obvious to modify the teachings of the present invention to other welding operations, and the present invention is to be understood as not limited to the detailed features of the preferred embodiment.

BRIEF DESCRIPTION OF THE DRAWINGS

The present invention will be better understood by reference to the following detailed description when read in conjunction with the accompanying drawing in which like reference characters refer to like parts throughout the views and in which:

FIGS. 3-24 and 50 define flow charts for system operation as engoverned by a program logic controller;

FIGS. 25-48 are display screens related to the present invention;

BEST MODE FOR CARRYING OUT THE INVENTION

Figure 1:
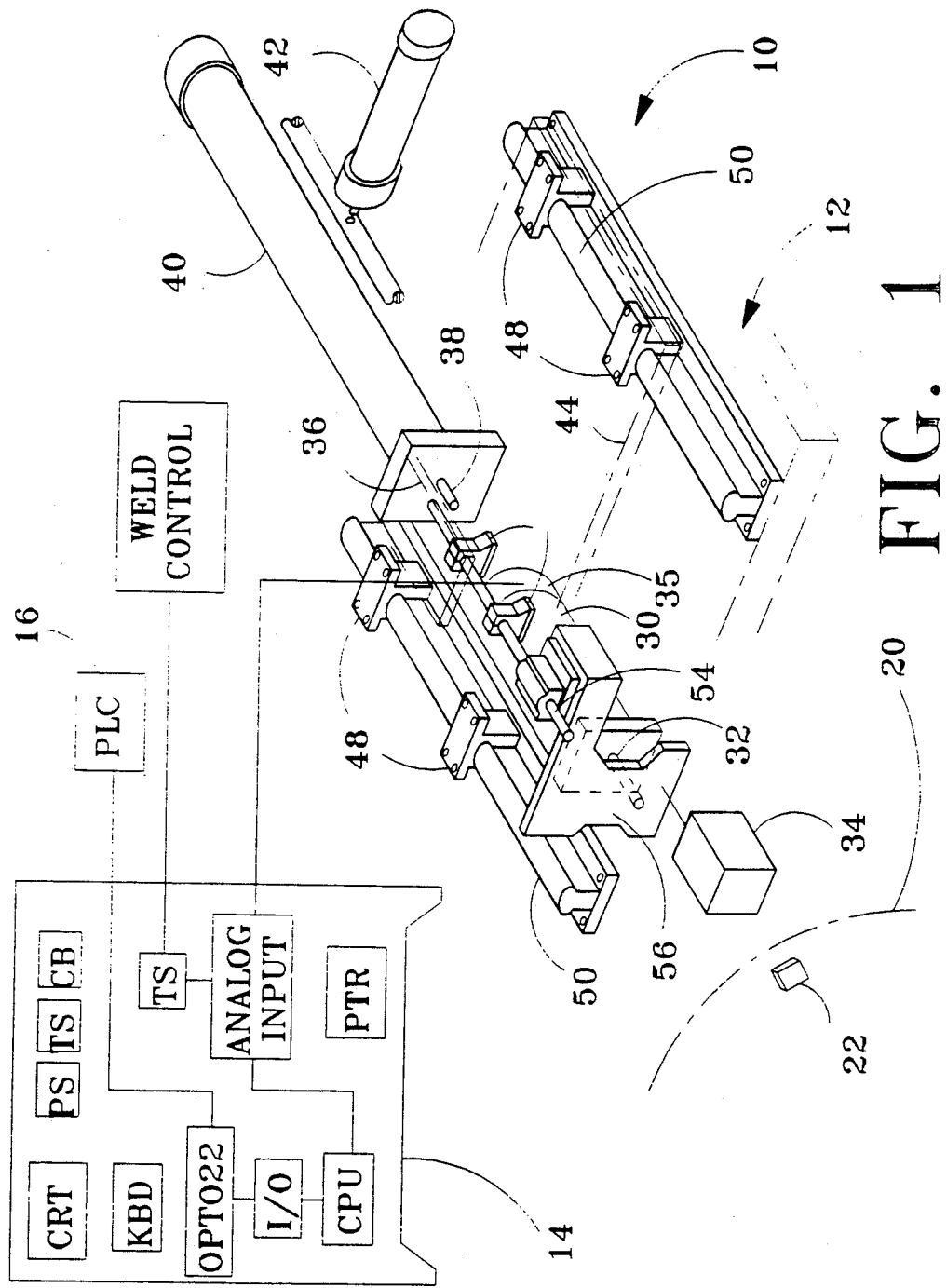
FIG. 1 is a perspective view of a welding apparatus constructed in accordance with the present invention.

Referring first to FIG. 1, a welding system 10 is there shown incorporating a weld gun apparatus 12, microprocessor control unit 14 and a programmable logic controller 16. Although the system of the present invention does not require a programmable logic controller, and may operate as a stand alone system, there are particular advantages to employing a programmable logic controller with the present. In particular, a programmable logic controller 16 may control the overall assembly of operation of which the welding function is only a part. As a result, the approach of workpieces, the rejection of workpieces due to poor quality and other inspection techniques may be enhanced by use of the present invention together with the other inputs an outputs used with the programmable logic controller to control a production process.

In the preferred embodiment, the control 14 may employ any standard industrial computer such as an IBM 7552 AT type computer. In addition to the microprocessing capabilities of the computer, the system includes a particular analog to digital (A/D) with an interface such as a Metrabyte STA-16 for communicating from the trigger circuit or welding sensor LVDT with the microprocessor. In addition, the input/output board is coupled by an interface such as a Metrabyte STA-U coupled with an opto 22 PB16T acting as a relay isolating the real time signals from the PLC to the computer operation.

The weld gun 12 is similar in many respects to the weld gun apparatus disclosed in U.S. Pat. Nos. 4,861,959, 4,684,778 and 4,542,277, and those disclosures are incorporated by reference to the extent necessary to understand details of the operation of the apparatus. However, for the sake of describing the present invention, additional components or portions of the device will be described below. In general, the welding gun in the preferred embodiment differs from the previously known apparatus in that it includes a single electrode mounted for sliding movement with the cylinder or the piston. Rather, the workpiece 20 to which a balance strip 22 is to be welded will be grounded to form the other electrode of the welding apparatus. Moreover, the details of the position on the workpiece 20 such as the turbine rotors shown in the preferred embodiment will be determined by other portions of the assembly apparatus (not shown) which are controlled by the programmable logic controller 16.

The gun 12 comprises a weld cylinder 30 whose piston 32 carries an electrode 34. A sensor mechanism 36 is secured to the cylinder 30 in a manner substantially as shown in the previously discussed patents. This apparatus is carried by a bracket 36 mounted to the piston 38 of a sender cylinder 40. The sender cylinder 40 prepositions the weld cylinder 30 at a predetermined work station location, and the weld cylinder is maintained in that location throughout the welding procedure by means of a locking cylinder 42 that transversely engages the sender cylinder 40 to lock the piston 38 in its extended position. The bracket 36 supports an extension bracket 44 supported by journal 48 along a rail 50 along each side of the welding cylinder 30. In addition, pilons 52 secured to the extension bracket 44 support a rail 54 engaged in journal supported by the electrode plate 56 to resist twisting of the electrode about the axis of the cylinders.

When the system is first turned on, the system automatically checks the system for proper operation. In particular, the condition of the A/D board, the digital I/0 board, whether a PLC is active, whether the sensor is properly mounted, the condition of trigger board, the system parameters defined, and the active status of a printer. If any fault is detected, the system will indicate the fault and ask the operator to check the interface and to recheck the system until all faults are corrected. On initial installation, parameter errors will be indicated, until all data files, for example weld schedule, gun, quality, etc., have correct data entered and saved.

The apparatus includes a calibrate function which is used to calibrate or zero the gun mounted sensor. Calibration is necessary when the system is started, restarted, when a new tip is installed, when checking tip wear by either confirming or updating the tip wear data, and when estimated tip wear exceeds the limit entered on the quality data screen. The calibrate sequence is reached by setting the apparatus for manual operation. The calibrate/reset alarm button on the control panel is activated. The station is then cleared, and the master part is loaded, aligned and checked, the ground cylinder is advanced, the slide cylinder is advanced and the slide lock cylinder is advanced. If a production part is used it would be less accurate, and the part must be rotated so that there is no weld balance weight strip or welded spot against the weld gun when the weld gun advanced. If a new tip is being installed, the alarm reset/calibrate button is pressed within 10 seconds to register the new tip change. If a new tip change is not registered, an old tip legend appears on a display screen of the industrial computer. The weld cylinder 30 and tooling to a part without a balance weight. No welding operation is commenced at this point. The weld cylinder, the locking cylinder 42 and the sender cylinder 40, the ground electrode cylinder, the master part is unchecked and the data reloaded for operation. The control can then be placed in either manual or automatic operation. Calibration may be done at any time for data collecting. Calibrate position and tip wear is saved in a file for every tip.

The system estimates tip wear continuously. A method of estimation is that the tip wear is determined by the difference between the average fit-up for the first 20 welds after calibration/recalibration, and the average fit-up in the last 20 welds, plus the difference between the original calibration and the recalibration. This method assumes that the part is somewhat uniform with a "constant mean" and that the temperature of the tip is constant such that the length of the tip is constant. Thermally caused tip length changes are insignificant. The tip wear file is updated and the amount of tip wear is displayed on each subsequent "recalibration" or tip replacement by flashing a message on the display screen. After welding a part, a summary screen will appear on the display indicating any plurality of weld features that may have been selected initially including the total number of parts made during the day, the number of quality parts, percentage of quality parts, total welds made, percentage of good welds, the number of good welds and the number of bad welds, good welds with explosion, the number of welds below tolerance, the number of welds above tolerance, the number of welds with under displacement, and the number and percentages of parts with each of a predetermined number of welds. In the preferred embodiment, the part may be provided with zero, one or two welds. However, up to 30 groups of welds per part could be performed with the same apparatus as menu selectable by the user. As limited by the preferred embodiments use of QB - 4.5 language.

An alarm light is used to notify the operator of a faulty product or faulty condition situation. The system permits such a condition to stop the operation. Examples of such situations include a number of successive good welds with explosion which exceed a predetermined limit, a number of successive bad welds exceeds a predetermined number, a number of successive edge welds exceeds a predetermined limit, the tip wear limit is at 100% or other user selected limit in which case the program automatically calls for recalibration or tip replacement, the number of successive underdisplacements beyond a predetermined number, the number of successive "overmaterial thickness limit" warnings beyond a predetermined number, the number of successive "undermaterial thickness limit" occurrences exceeding a predetermined number, a fit-up position at or near the calibration position indicating that no balance strip is detected or fit-up position beyond tolerance indicating the double strip situation. Alarm conditions are also generated for gun sensor "out of position" as when the gun is stuck by a weld to the workpiece. The alarm is also actuated for a fit-up position grossly past the calibration position as were an electrode tip or workpieces missing. Furthermore, a system fault will also be indicated as an alarm condition. The system will not "alarm and/or shut down" with a partially welded part. If the number set on the quality specification screen is reached on the first weld of a strip which requires two welds, the second weld will be made before the "alarm/shut down" will occur. The first five conditions refer to above will generate a stoppage at the end of a production cycle. The six latter conditions will stop and hold the position immediately for the operator to continue welding or to correct a condition of the fault source. When an alarm occurs, the screen indicates what kind of problem has been detected and pushing the "reset alarm" actuator will cause the system to recheck.

A first mode of operation is in the apparatus with a PLC, the apparatus 10 will analyze the quality of the welds in real time while integrating with the PLC for control and operation. When the program has started, a "prephase" screen will appear. The "alarm reset" button must be pressed to continue the program the system's "check" screen will appear to verify that all system elements are functional. Any fault present will be displayed on the screen of the industrial computer. The operator then presses the "alarm reset" button to continue the program. The first item to be done is the calibration. The calibration is performed according to the following discussion regarding critical parameters. However once the calibration has been completed, the "mode select" screen will appear for mode input. The operator then presses the "alarm reset" button and the operation sequence will repeat automatically.

The operation sequence involves a monitor checking to assure that the weld gun is "home". If home, the "gun home" signal is delivered to the PLC. Once the "reset" signal is on, a monitor will read the number of welds from the digital I/O and will wait for the "request fit-up check" signal from the PLC. When the "request fit-up check" is received, the apparatus will scan the sensor while the gun moves, and will determine the "fit-up" of the balance weld strip. If there is not "part missing", the material thickness limit condition indicating under or over a predetermined limit, the computer signals the PLC with a fit-up ok. signal designated as "FIT UP OK".

When the fit-up is ok a "fit-up ok" is displayed on the screen, and this is immediately followed by a "start weld" signal to the weldtronic control and "ready" signal from the computer will turn off. The apparatus awaits a "trigger" signal from the welding transformer. Once the trigger is "activated", the monitor scans the sensor at the rate of 1800 samples per second. Once the first weld is completed, the monitor checks the "gun home" position again and outputs the "gun home" ok signal. The weld analysis is then performed on a graph of the "tip/piston rod movement versus time" will be displayed on the screen. The monitor outputs a "ready" signal to the PLC and awaits the next weld. In the second weld, the monitor repeats the same routine as in the first procedure. After the second weld is completed, the monitor evaluates the quality of the welding of that particular part and displays a summary report. In addition, the monitor outputs a "reject part" signal if necessary, checks for "gun home" signals, saves "weld data" and prints out a "bad weld" report if any. When completed, the "ready" signal from the monitor will be on again indicating to the PLC that the monitor is ready for the next part. The above described sequence is a typical operation for welding a part with two welds, and it will be understood that a single weld will be performed if a one weld operation has been selected. When a system error occurs, the system pauses, and displays an error message on the display screen. The operator then copies the error code and presses the calibrate/reset alarm button to continue. If the error is not "fatal" the system will recover. If the system fails to get out of the "system fault" additional technical support must be sought. The operator panel lights indicate why a machine may stop operating. If a "red" alarm light is "on", and the problem is monitored by the system, a message will be shown on the display screen.

Figure 2:
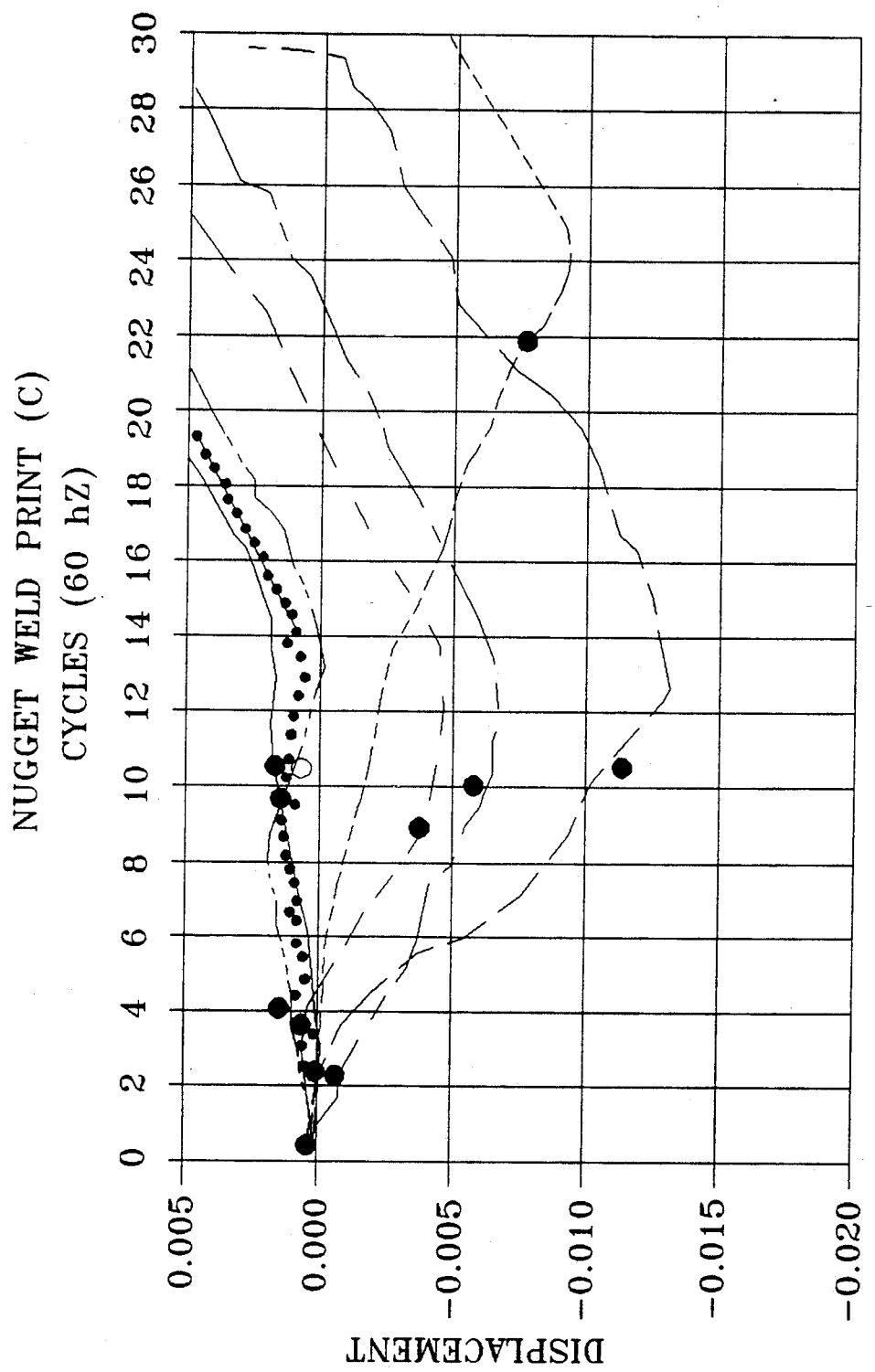
FIG. 2 is a graphical representation of welding performance in and monitoring provided by the present invention.
Figure 3:
Figure 4:
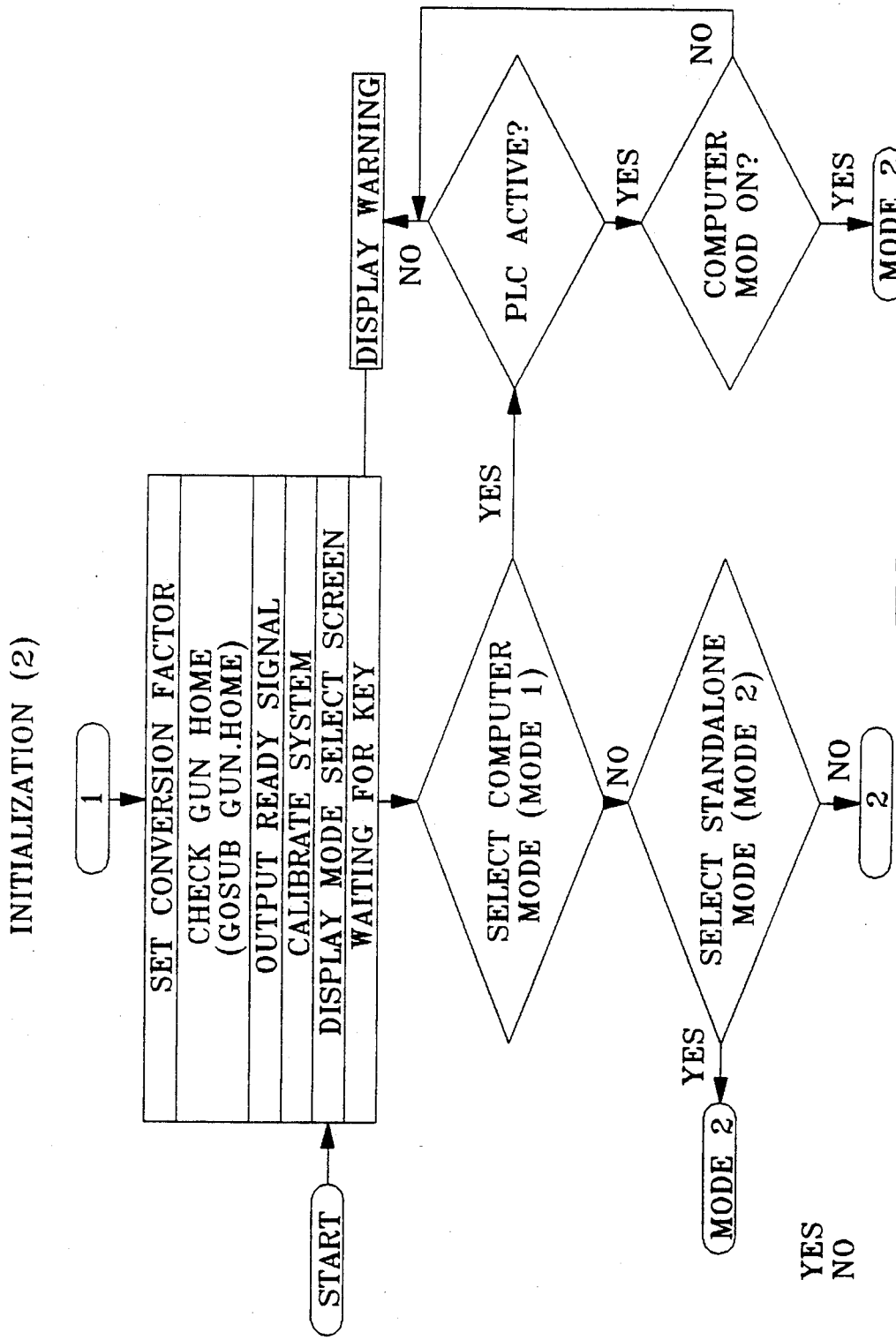
Figure 5:
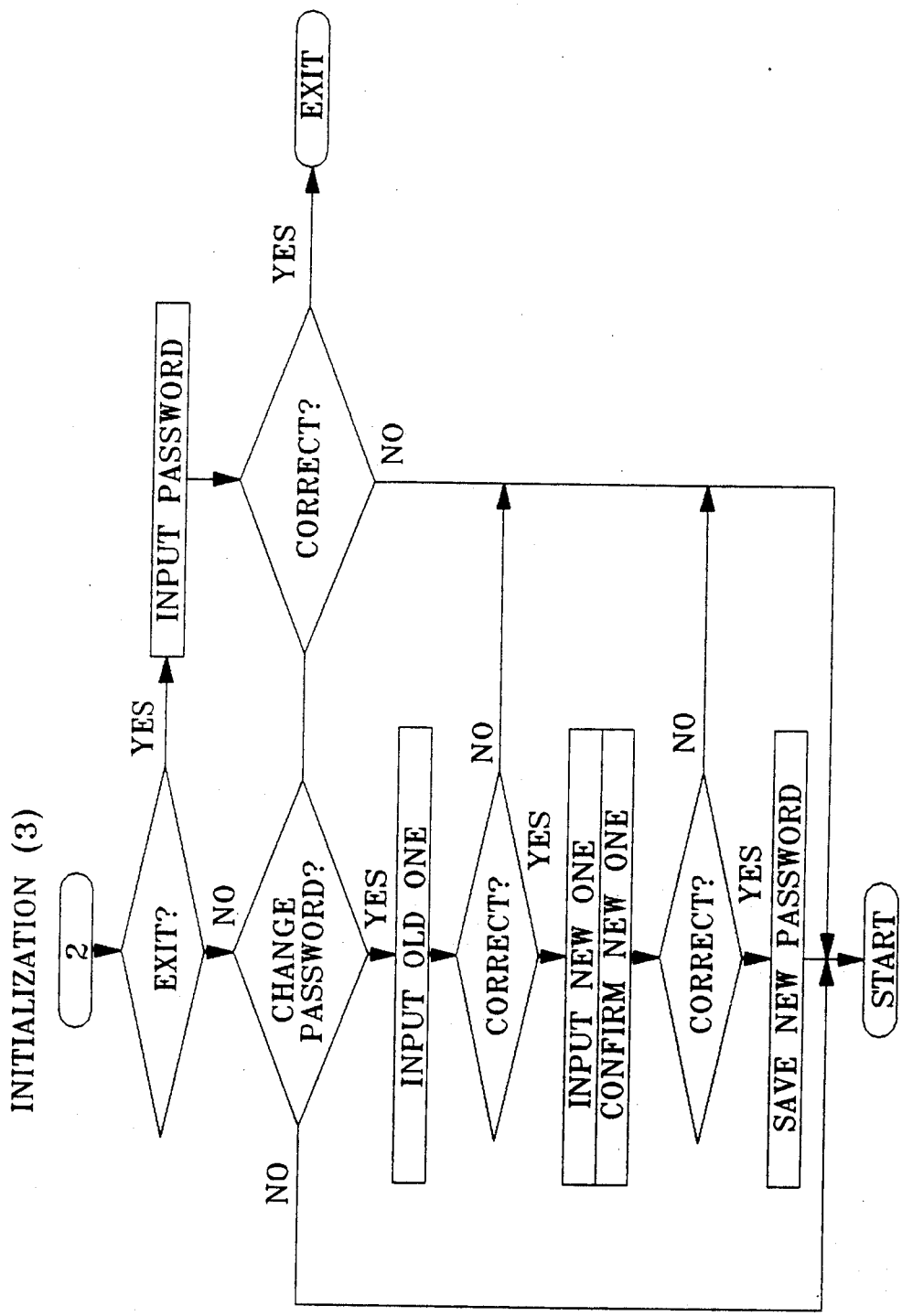
Figure 6:
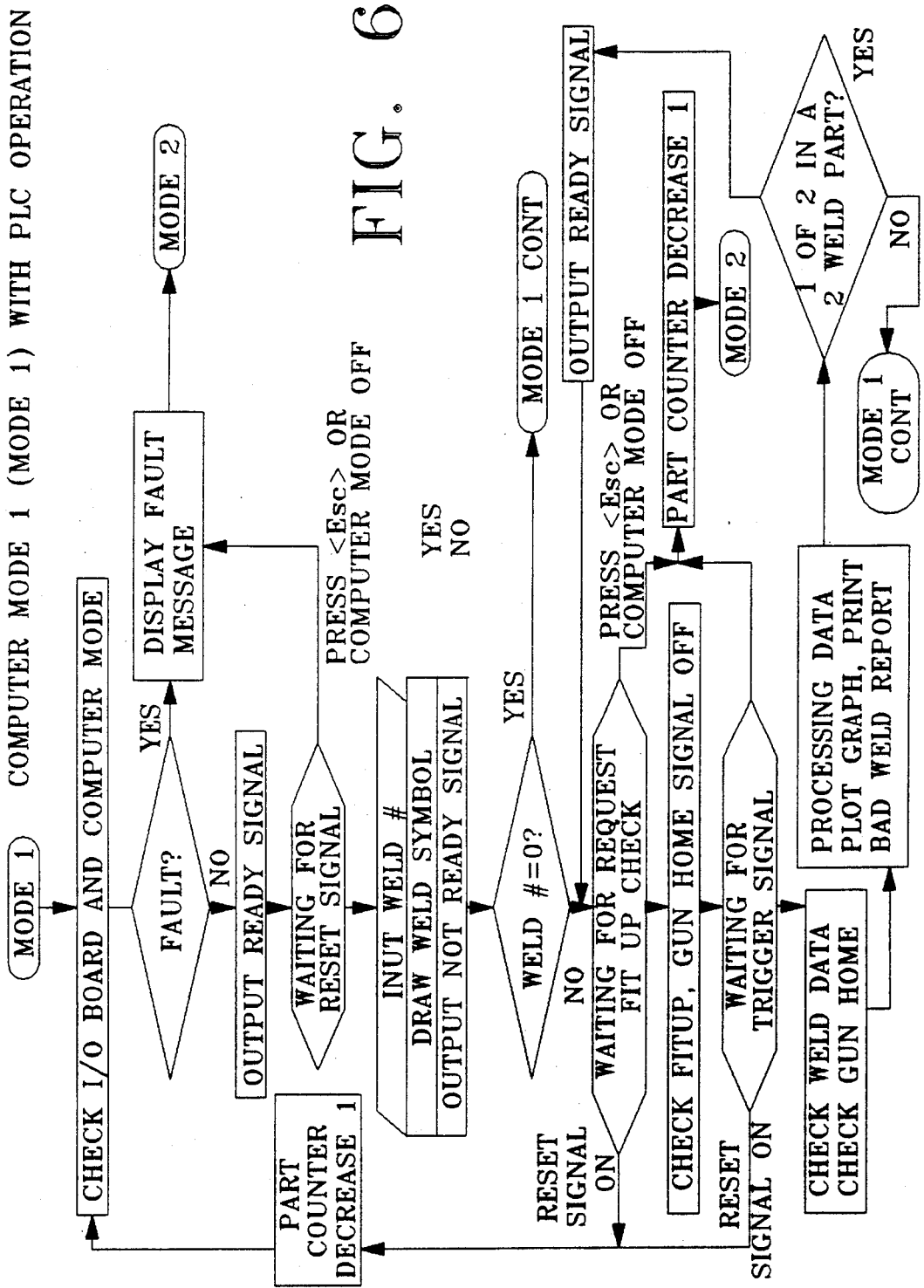
Figure 7:
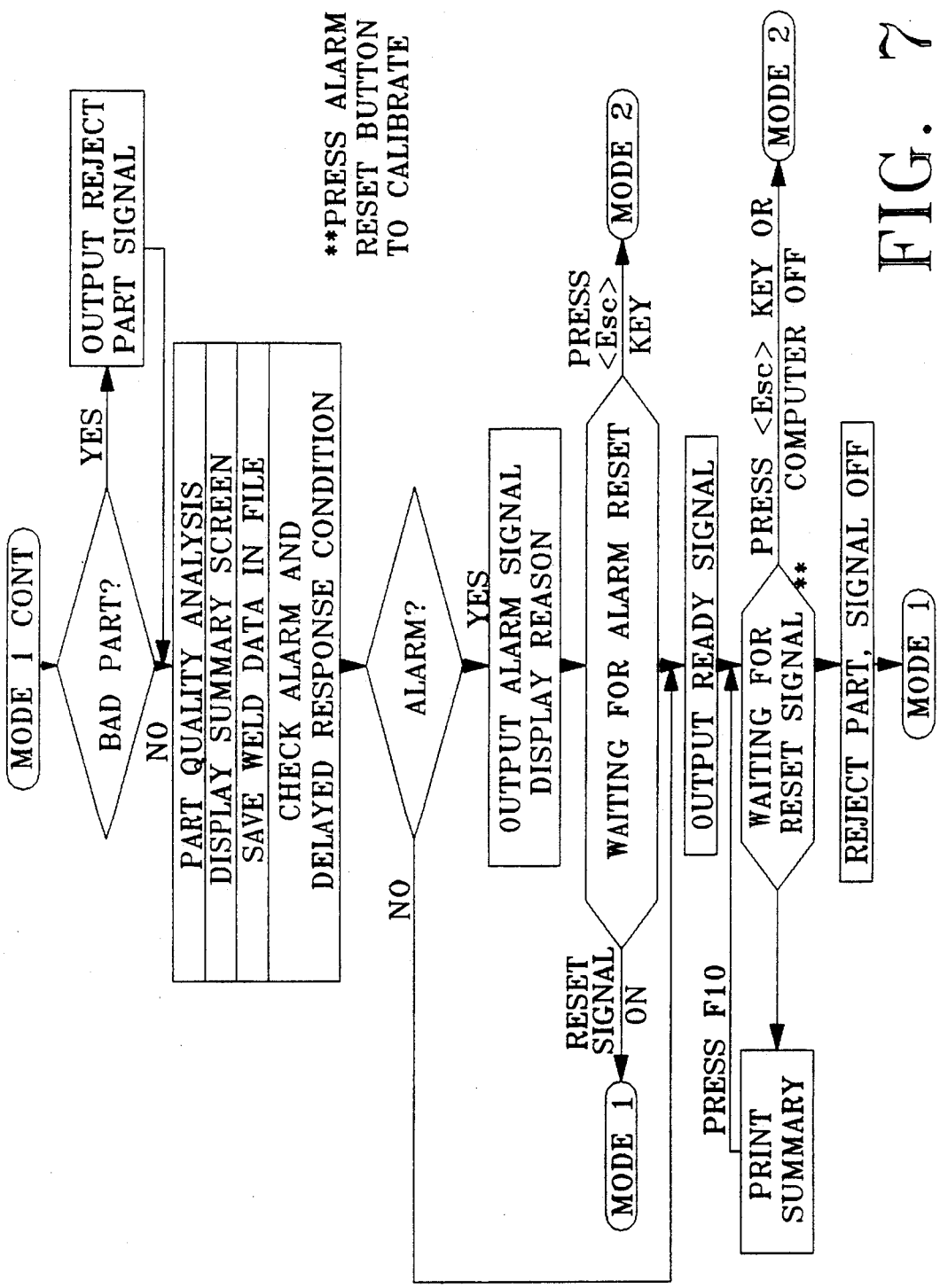
Figure 8:
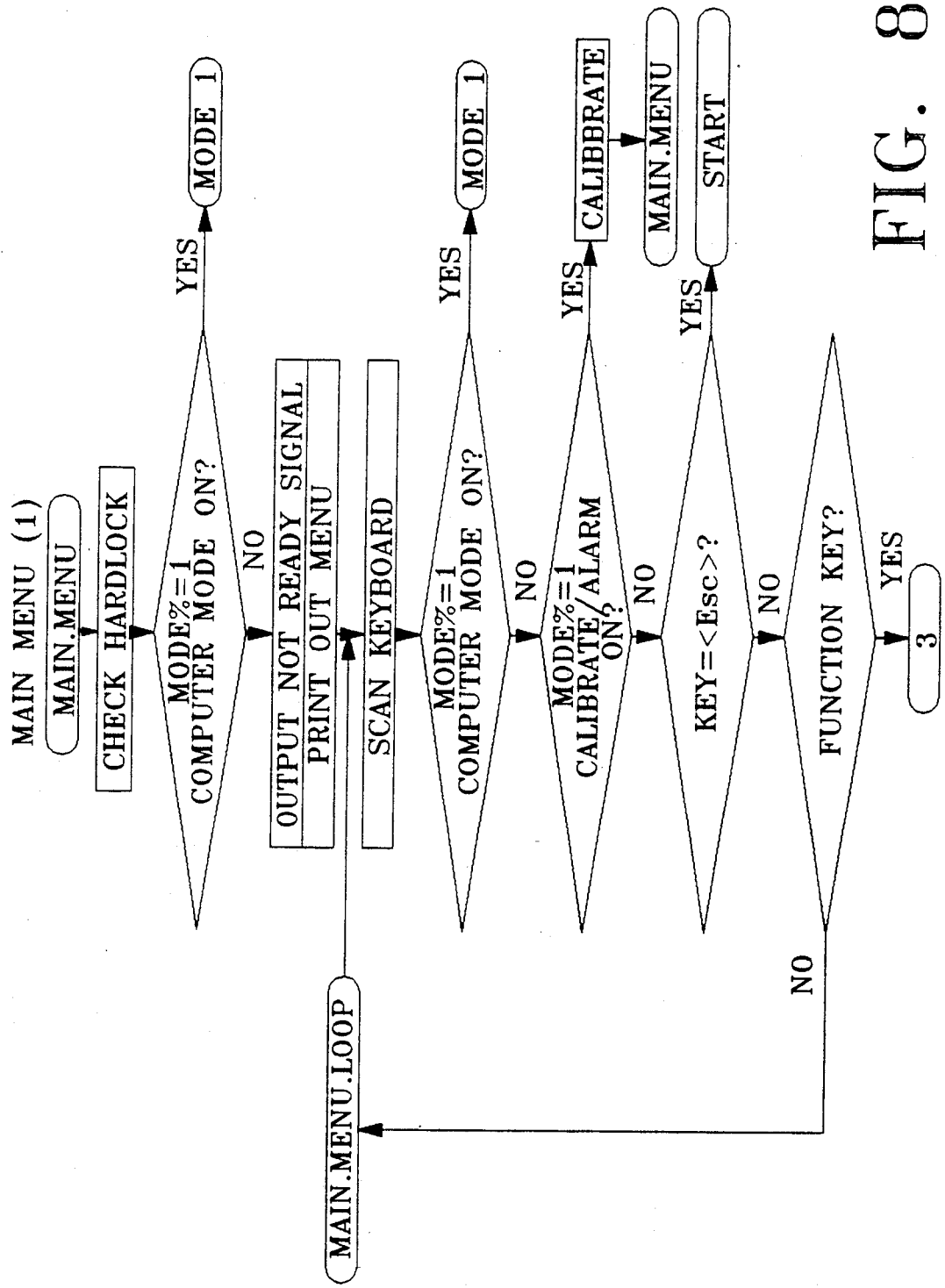
Figure 9:
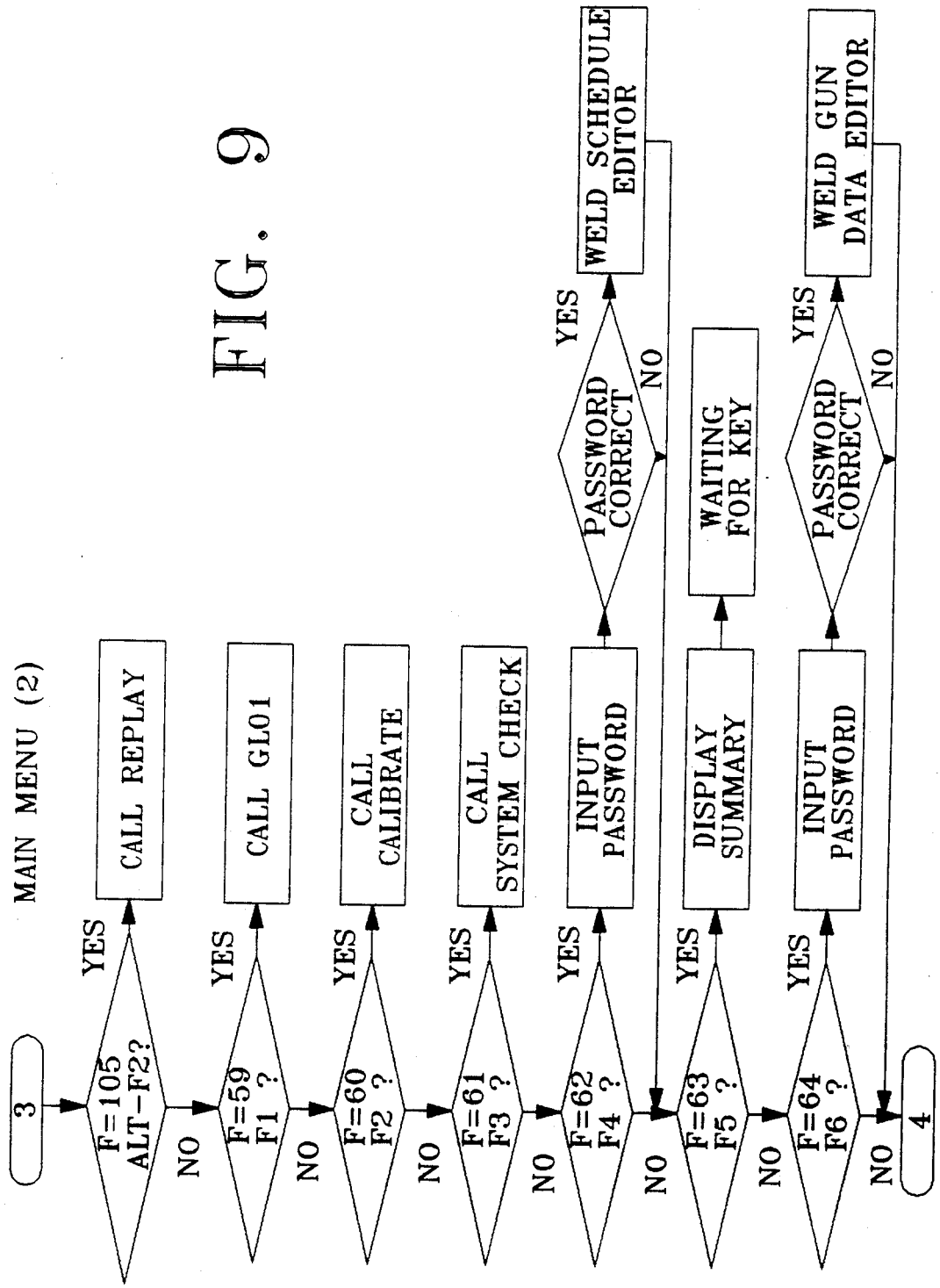
Figure 10:
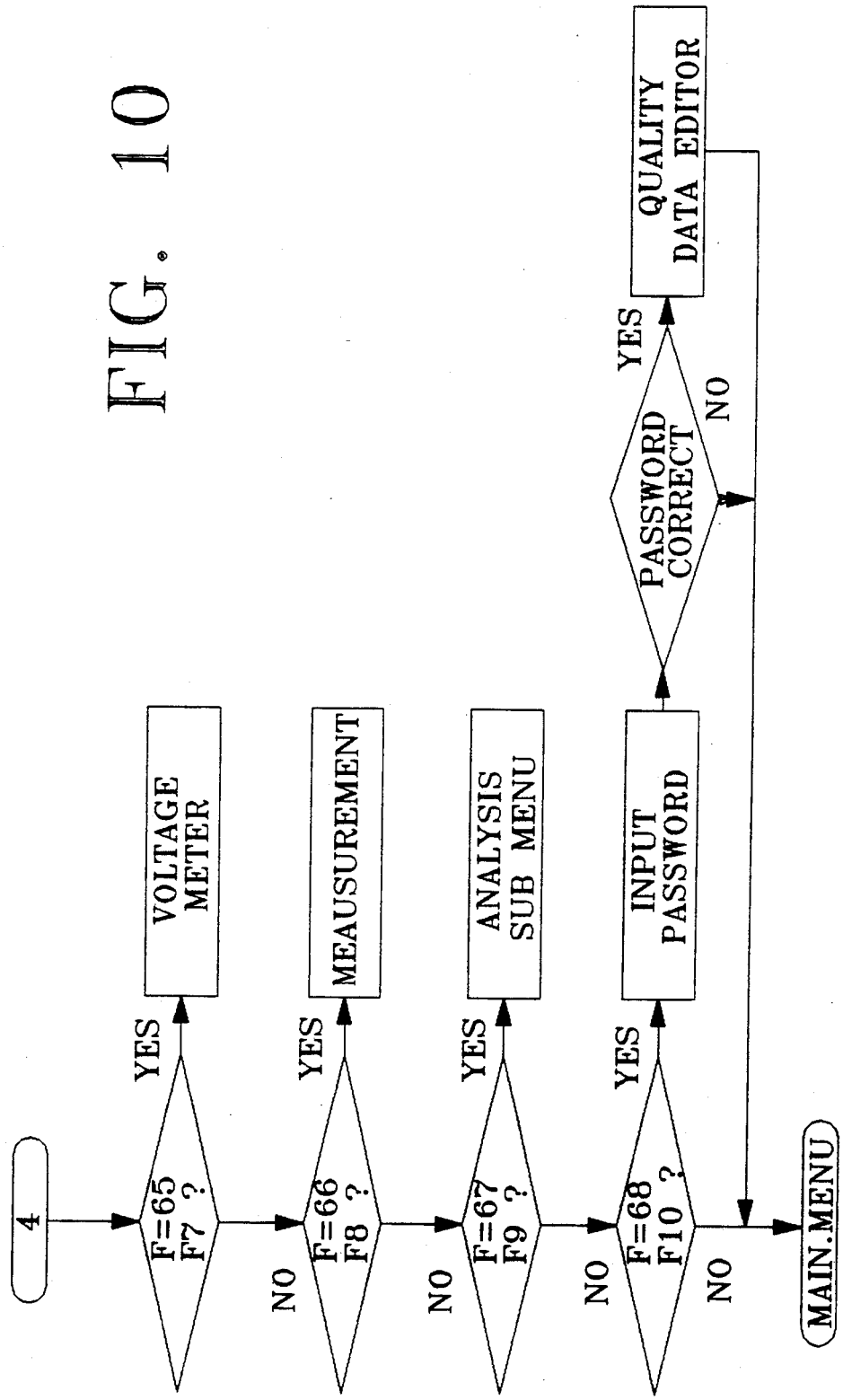
Figure 11:
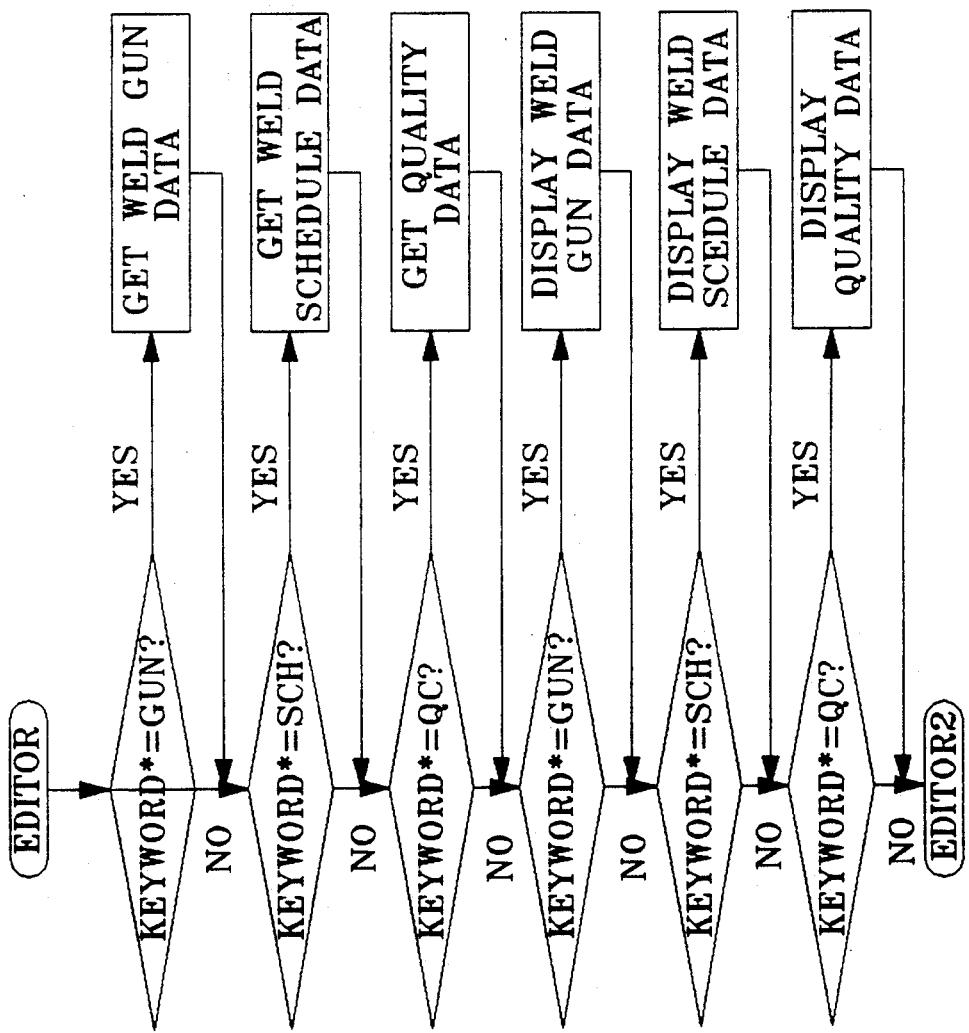
Figure 12:
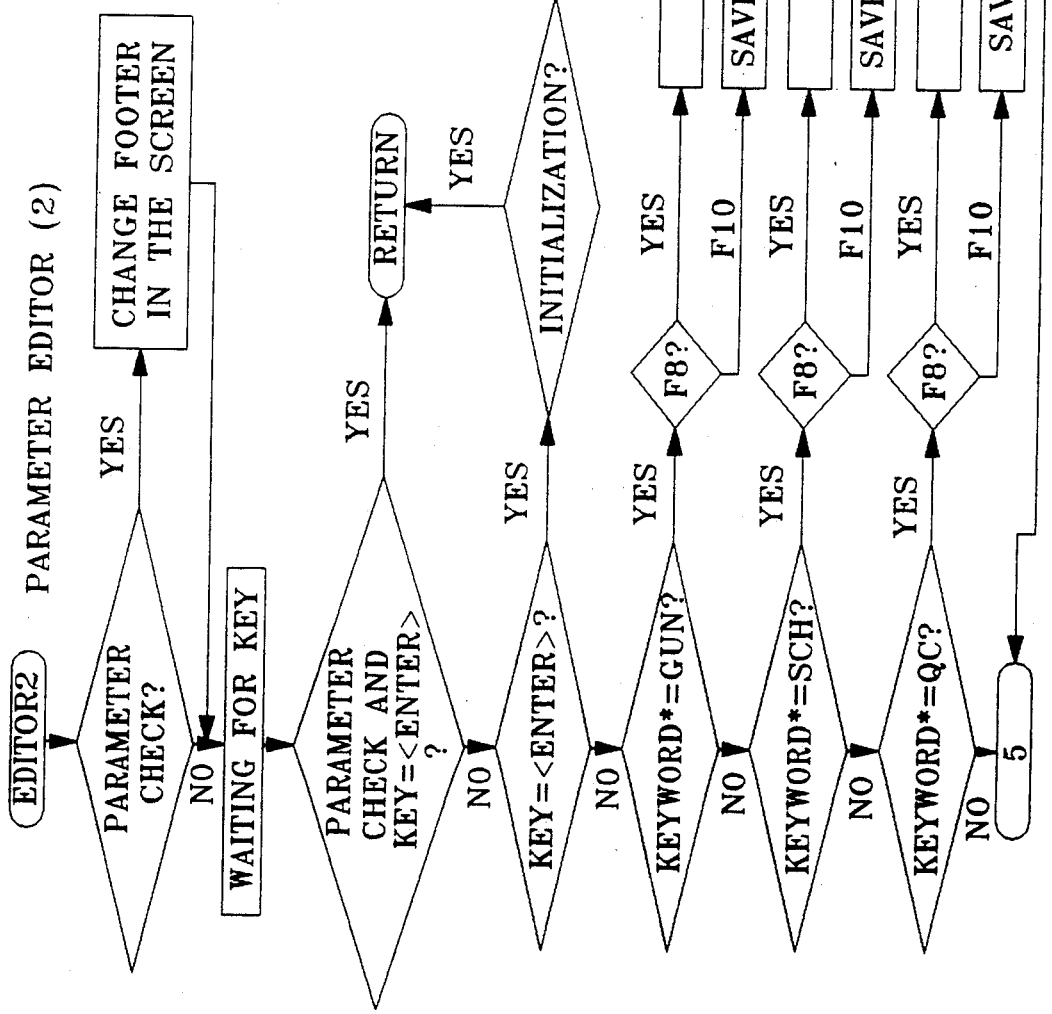
Figure 13:
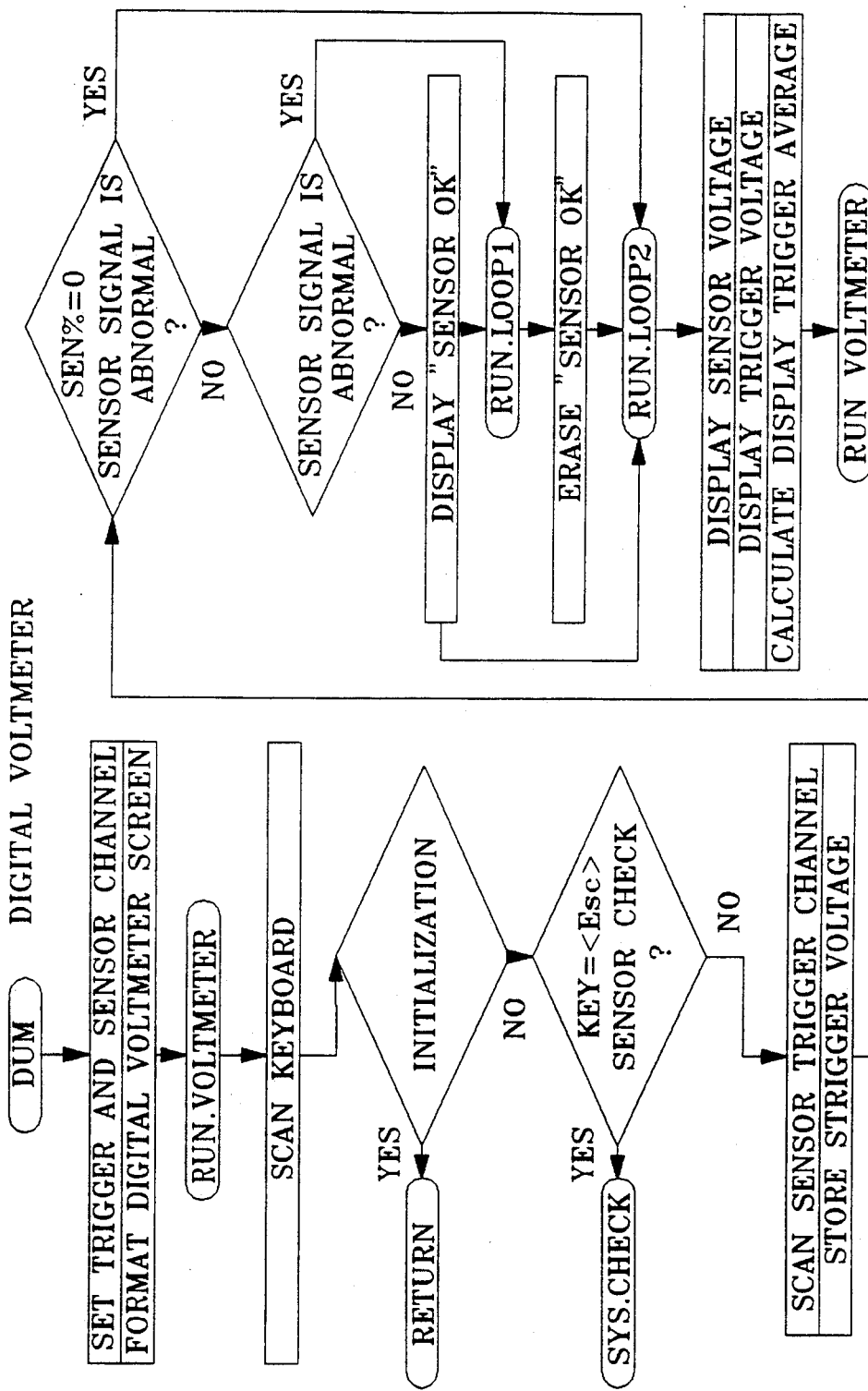
Figure 14:
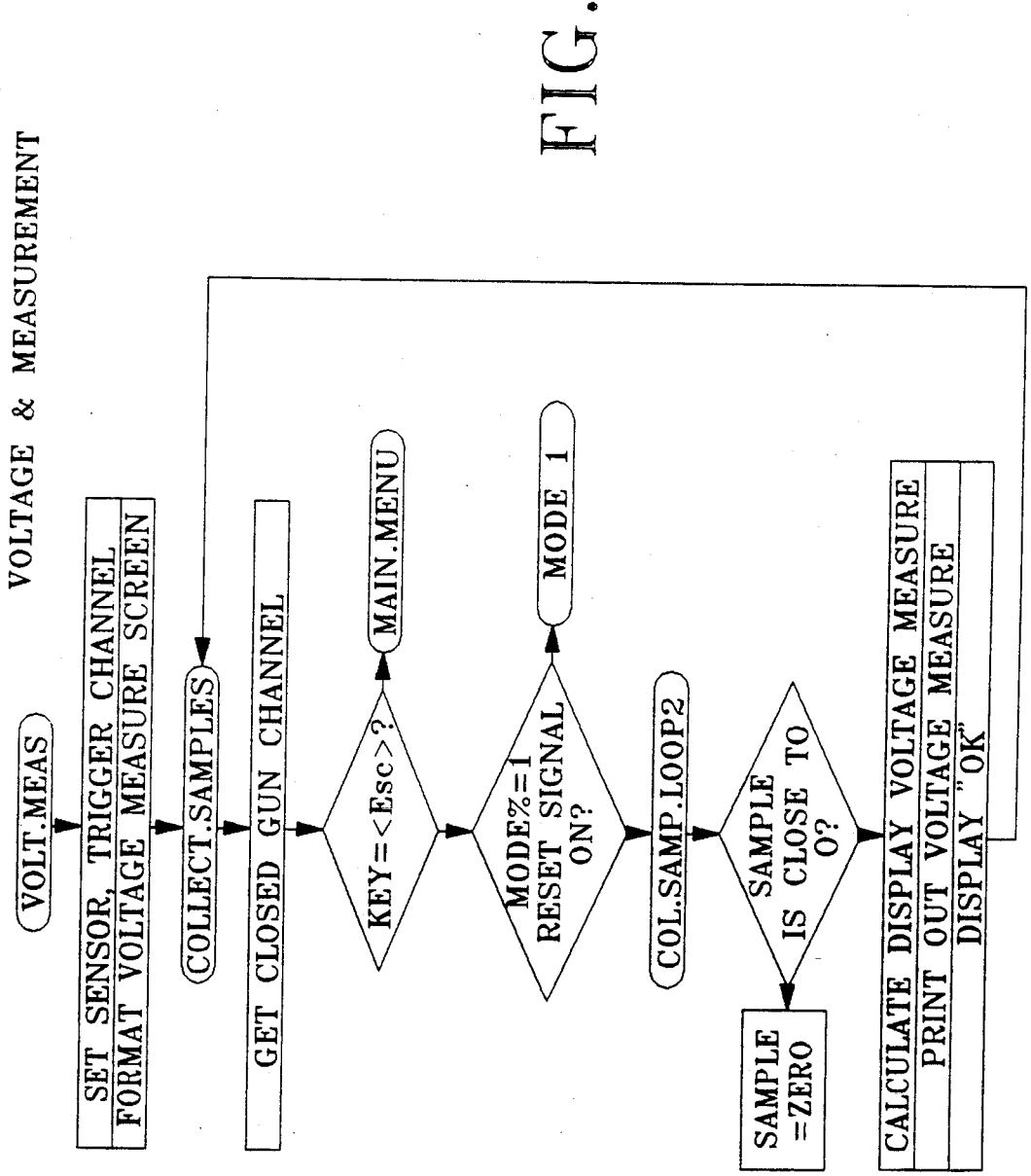
Figure 15:
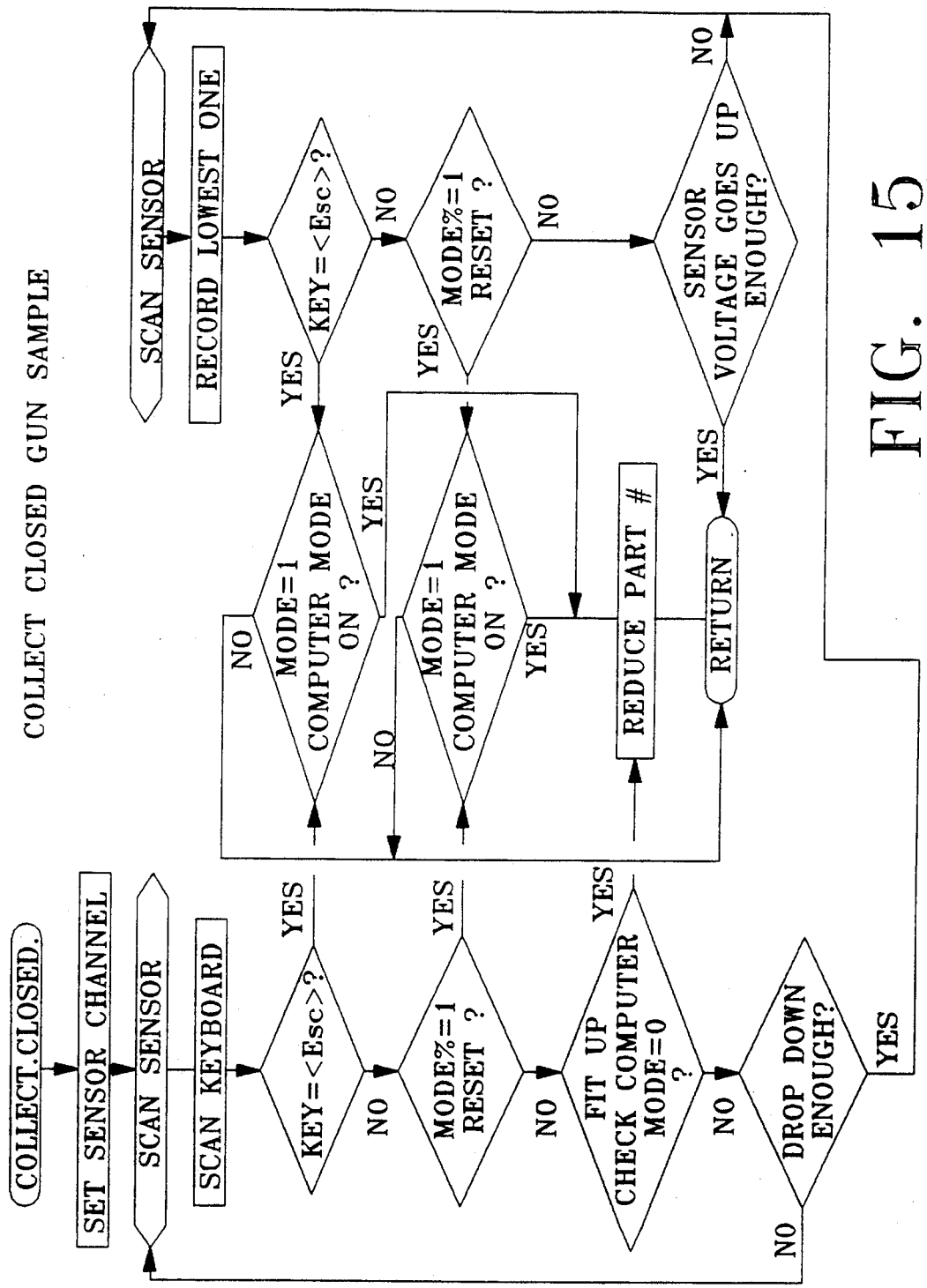
Figure 16:
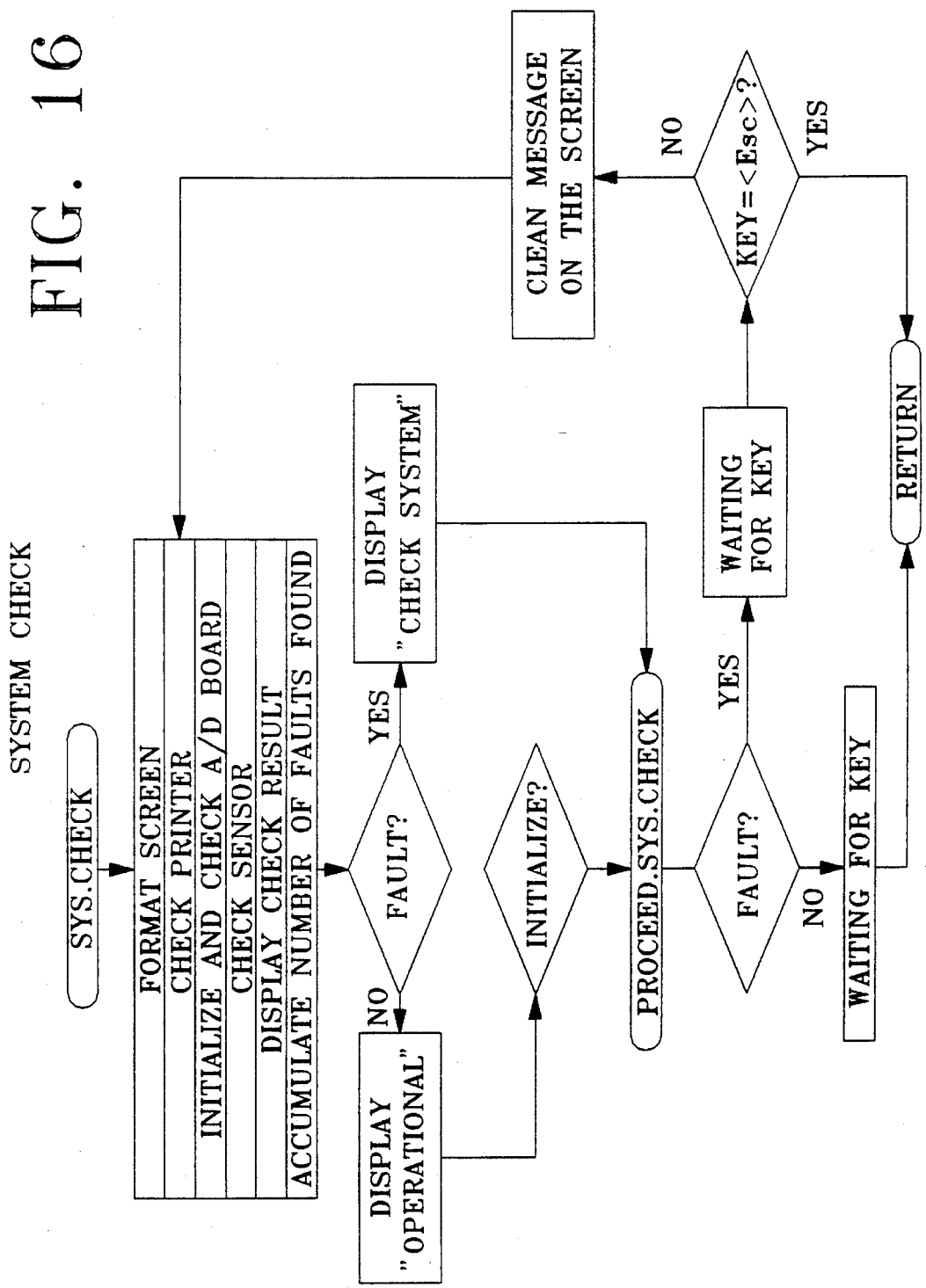
Figure 17:
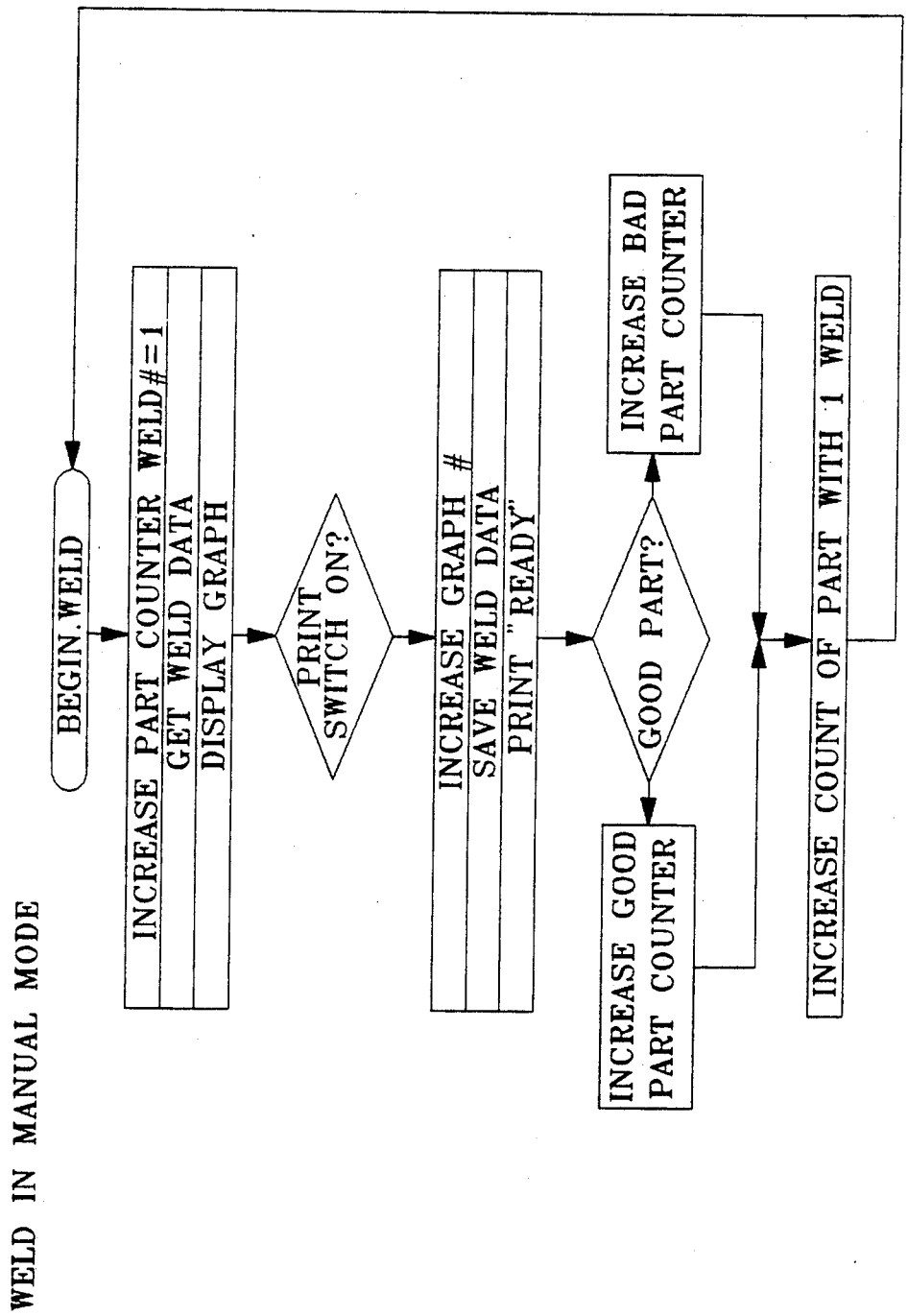
Figure 18:
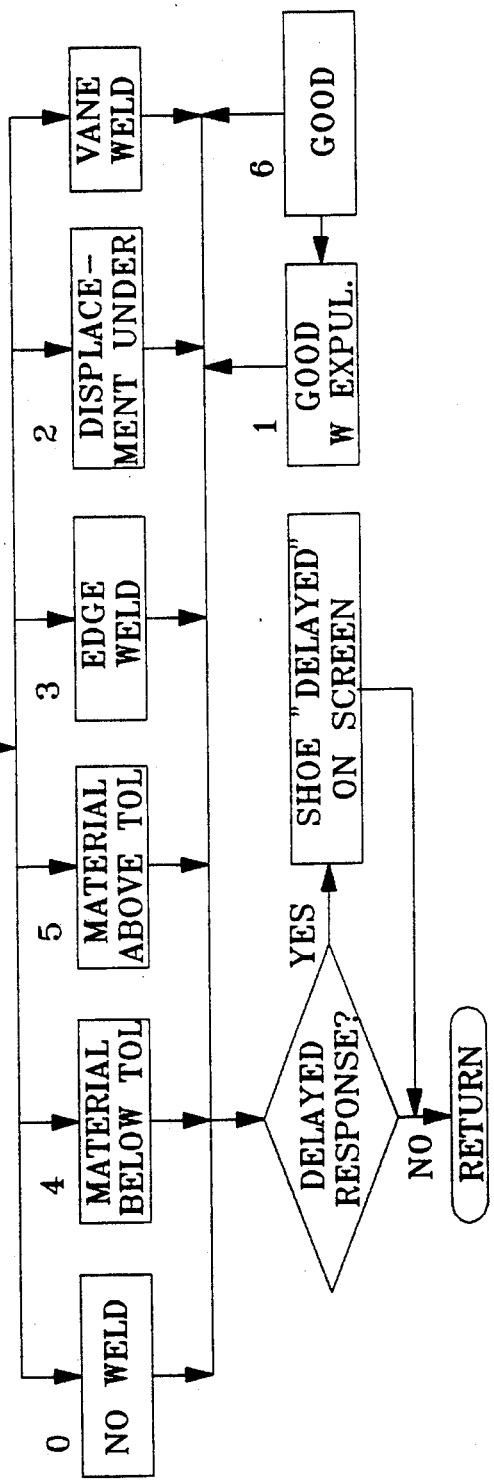
Figure 19:
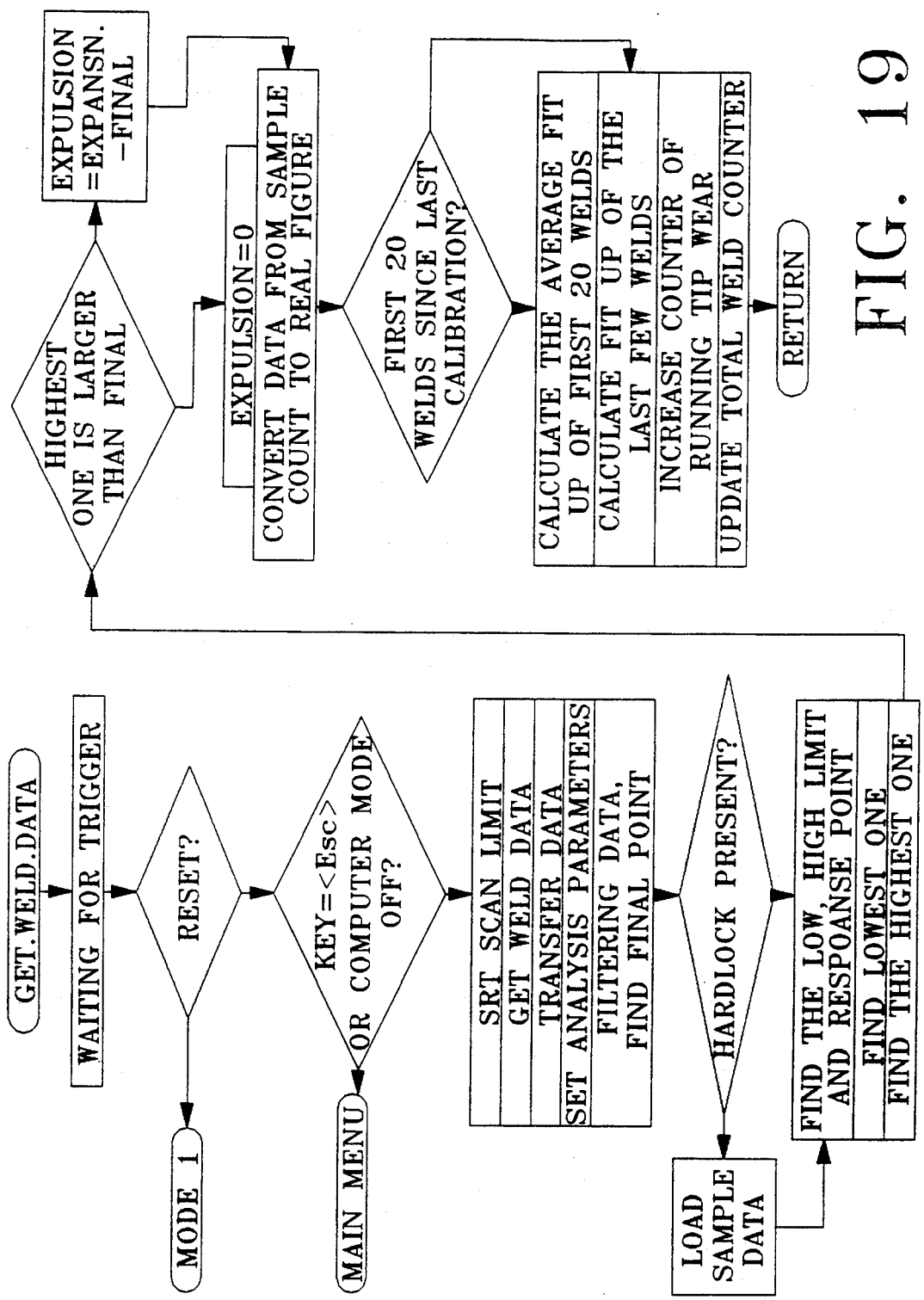
Figure 20:
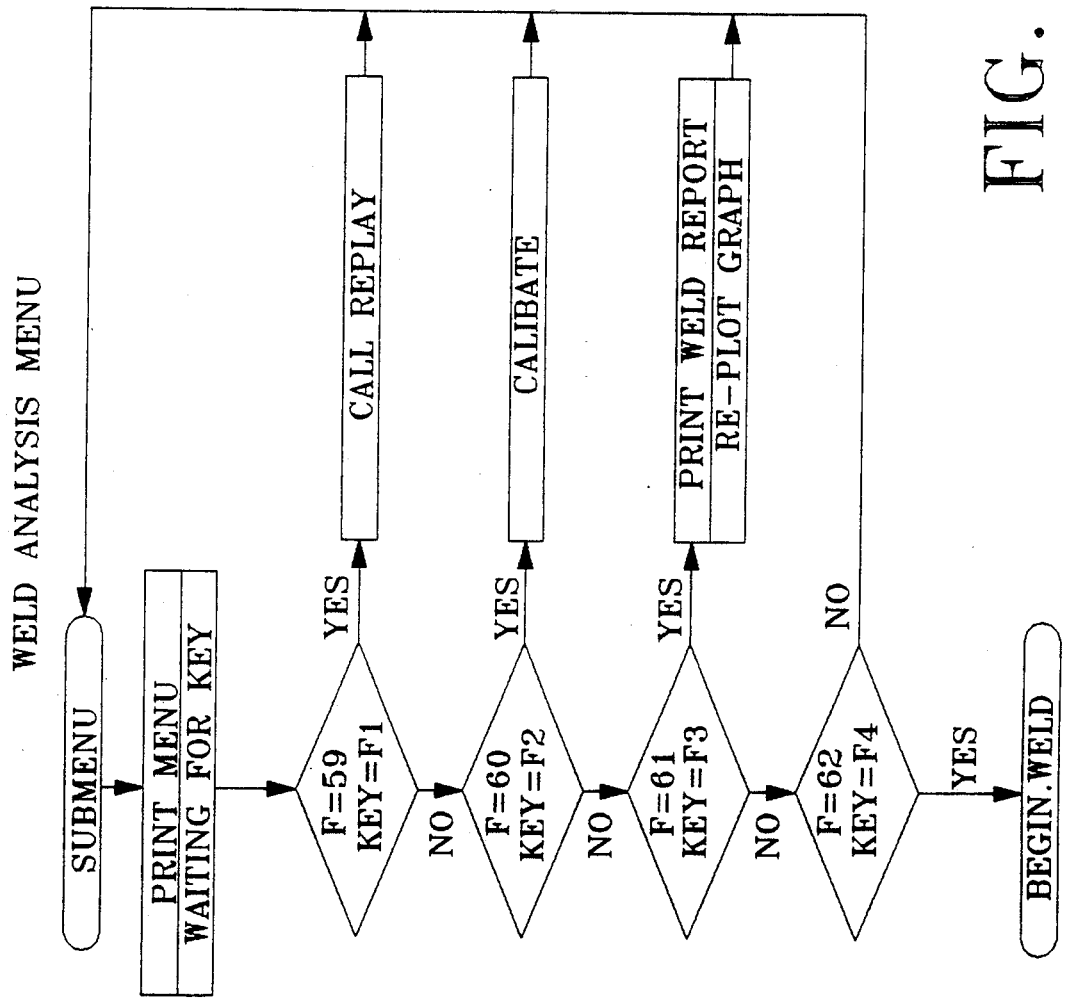
Figure 22:
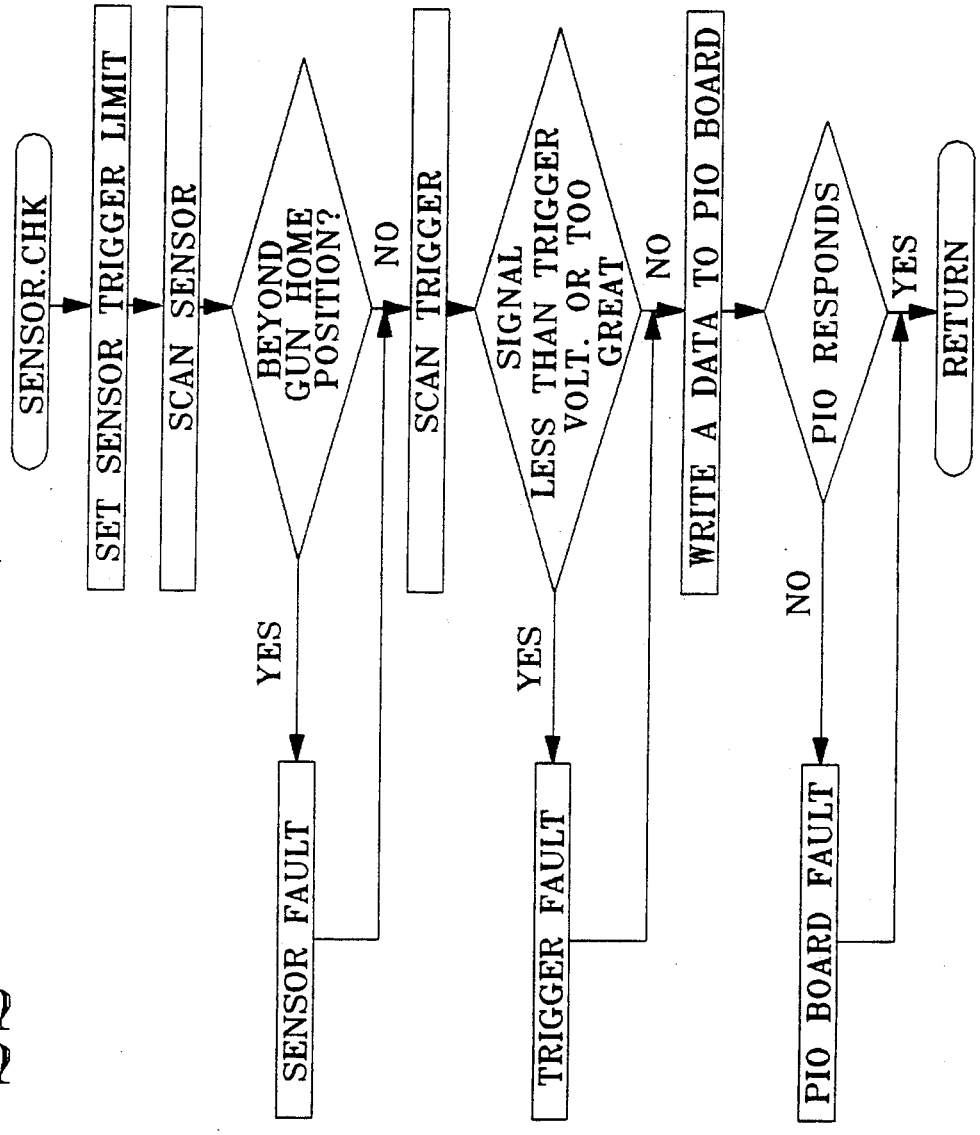
Figure 23:
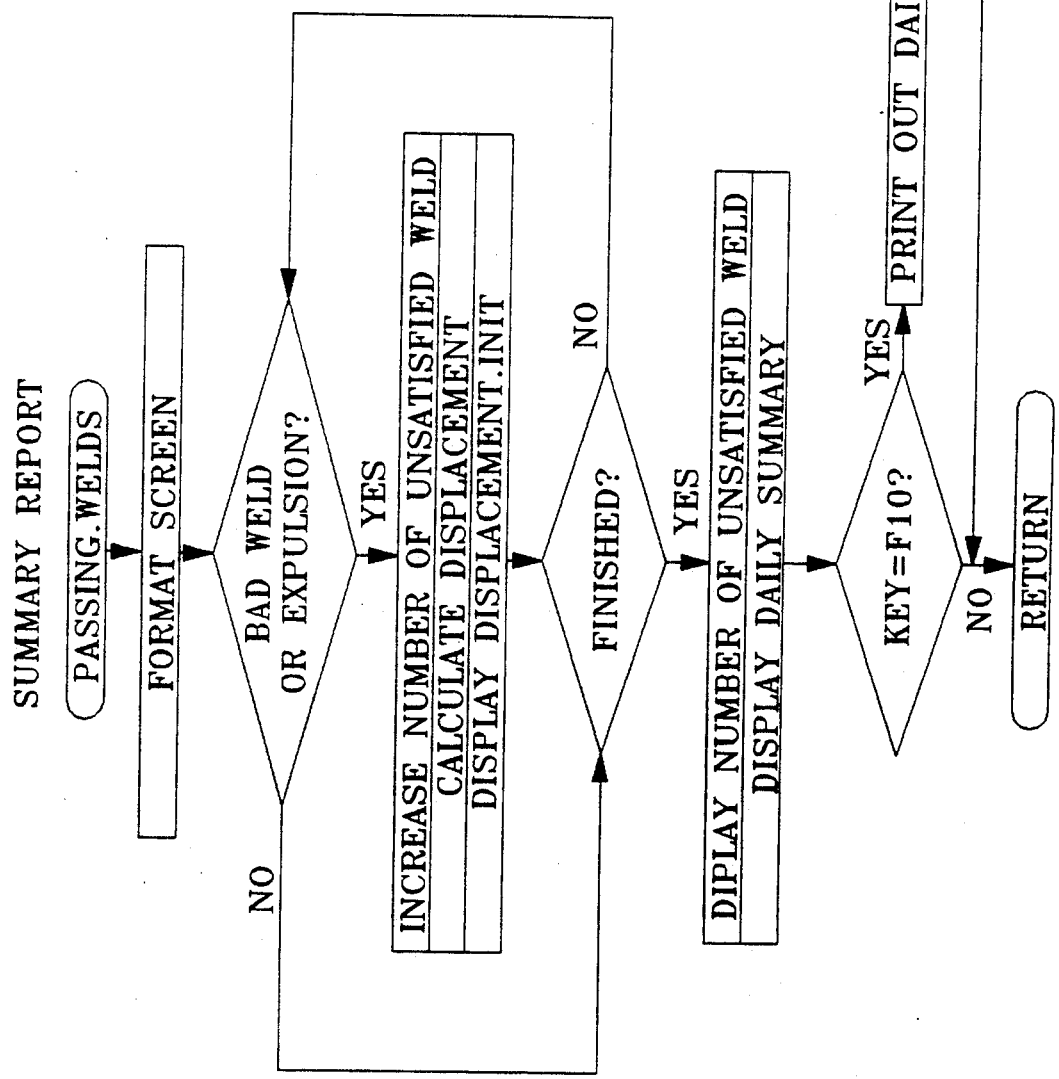
Figure 24:
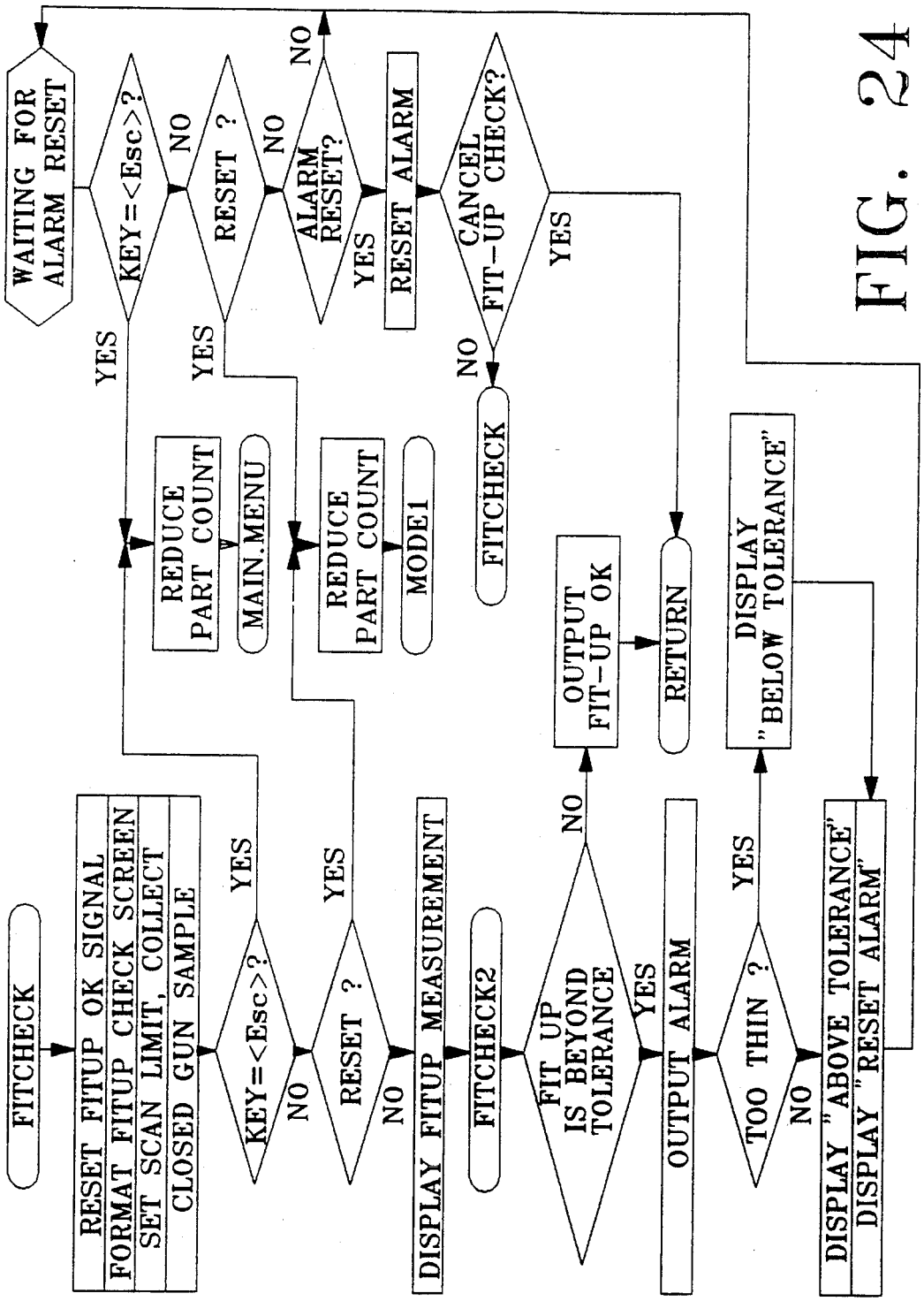
Figure 28:
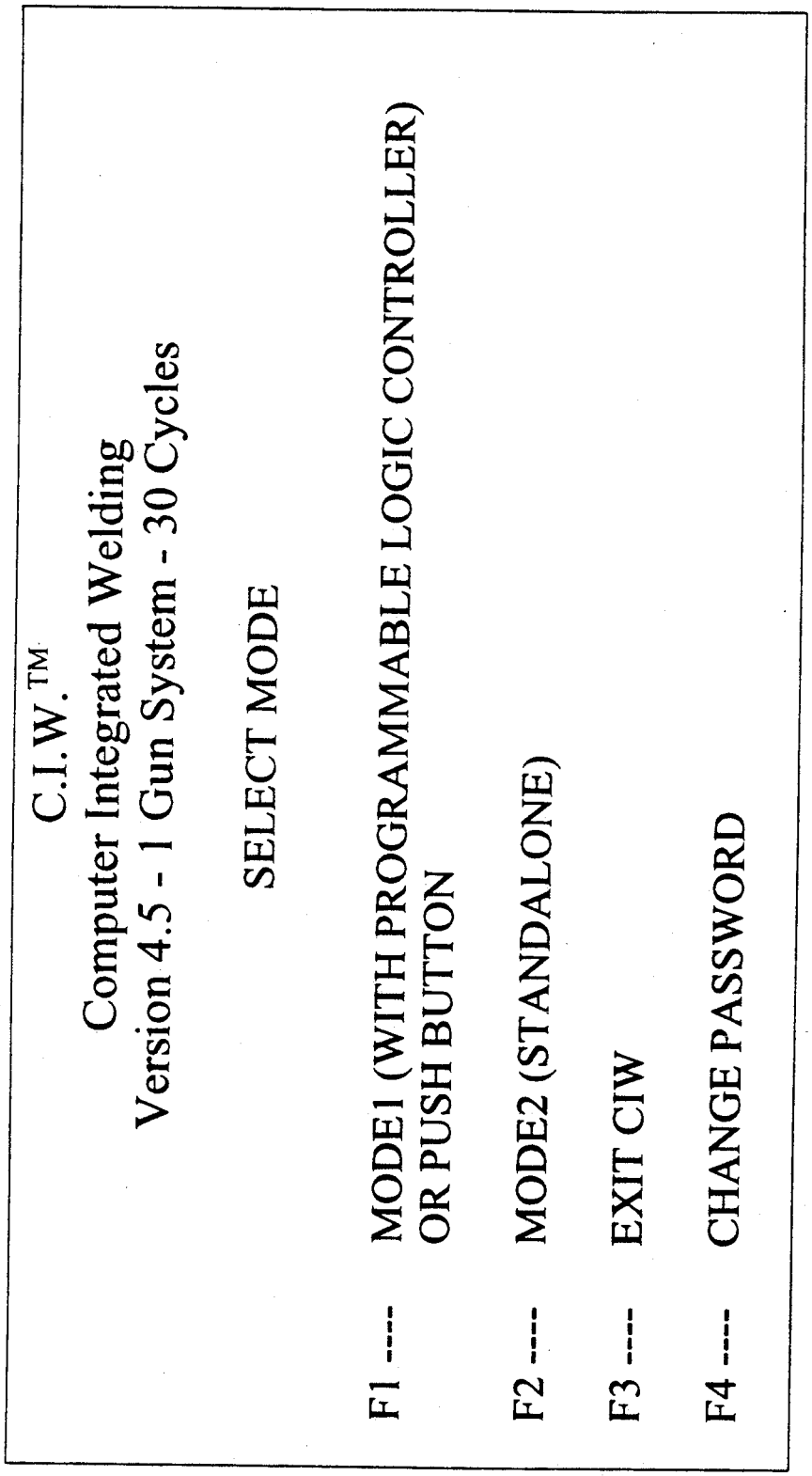
Figure 45:
Figure 46:
Figure 47:
Figure 48:
Figure 49:
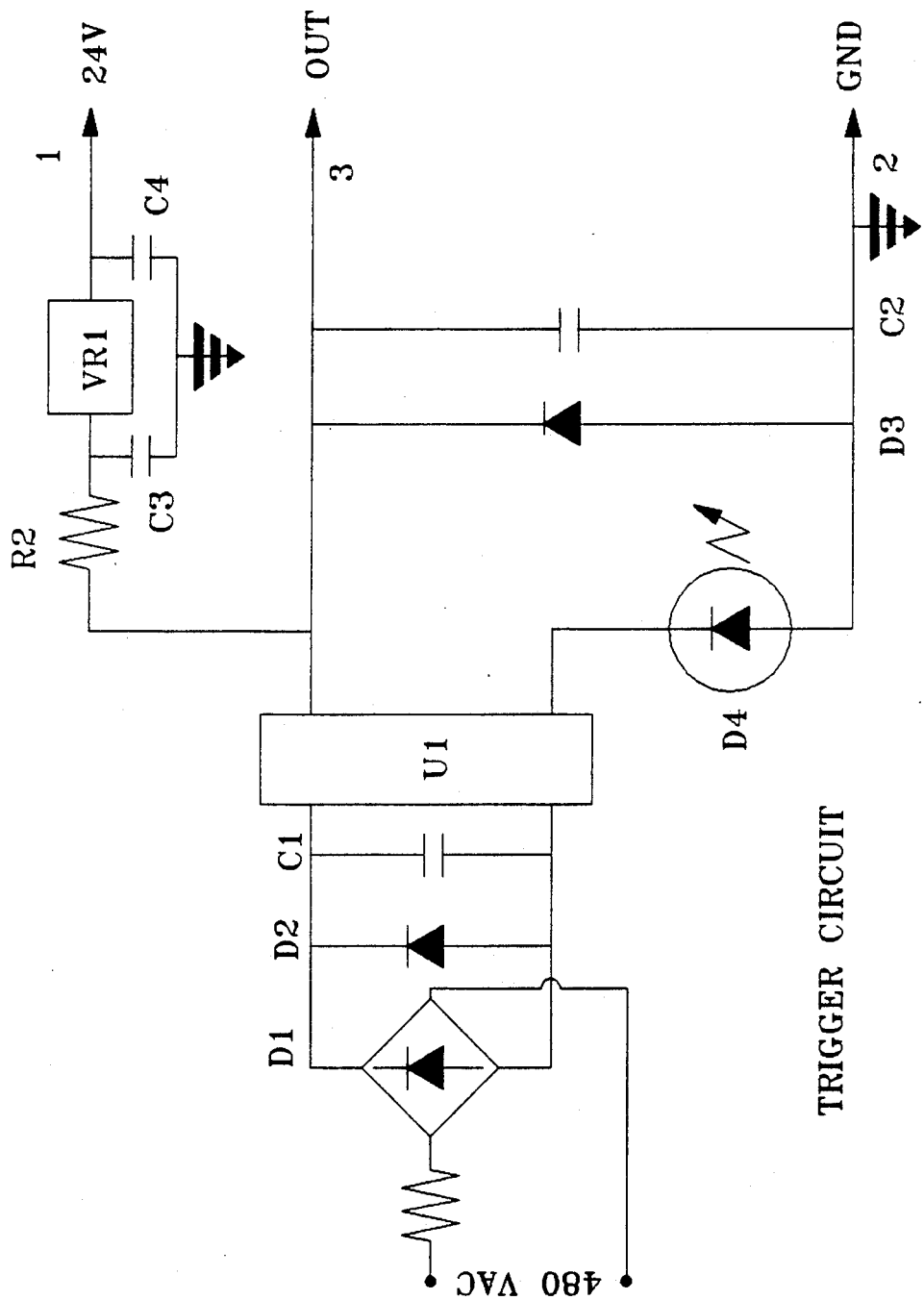
FIG. 49 is a schematic diagram of a trigger circuit used in practicing the present invention.
Figure 50:
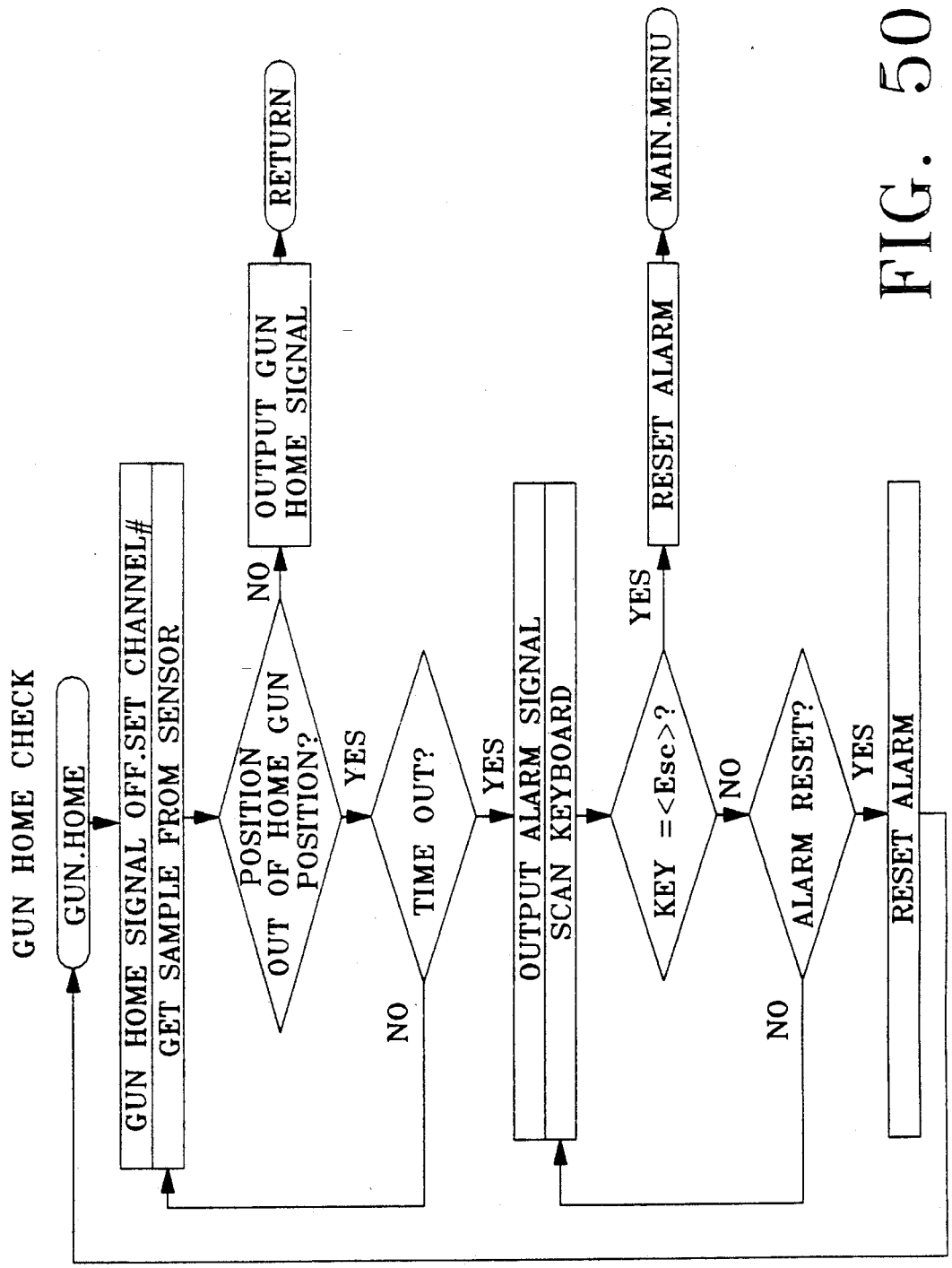
Figure 51:
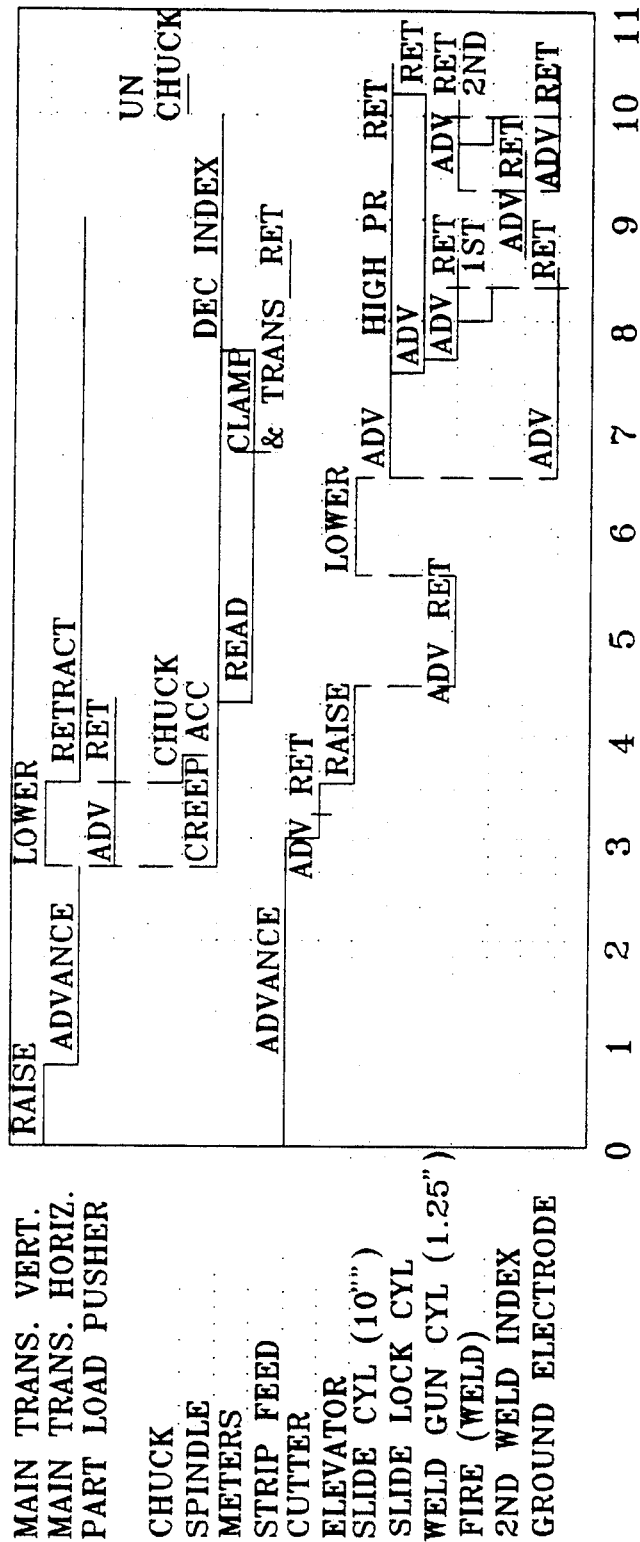
FIG. 51 is a time line graph of selected procedures in the process of the present invention.
Figure 52:
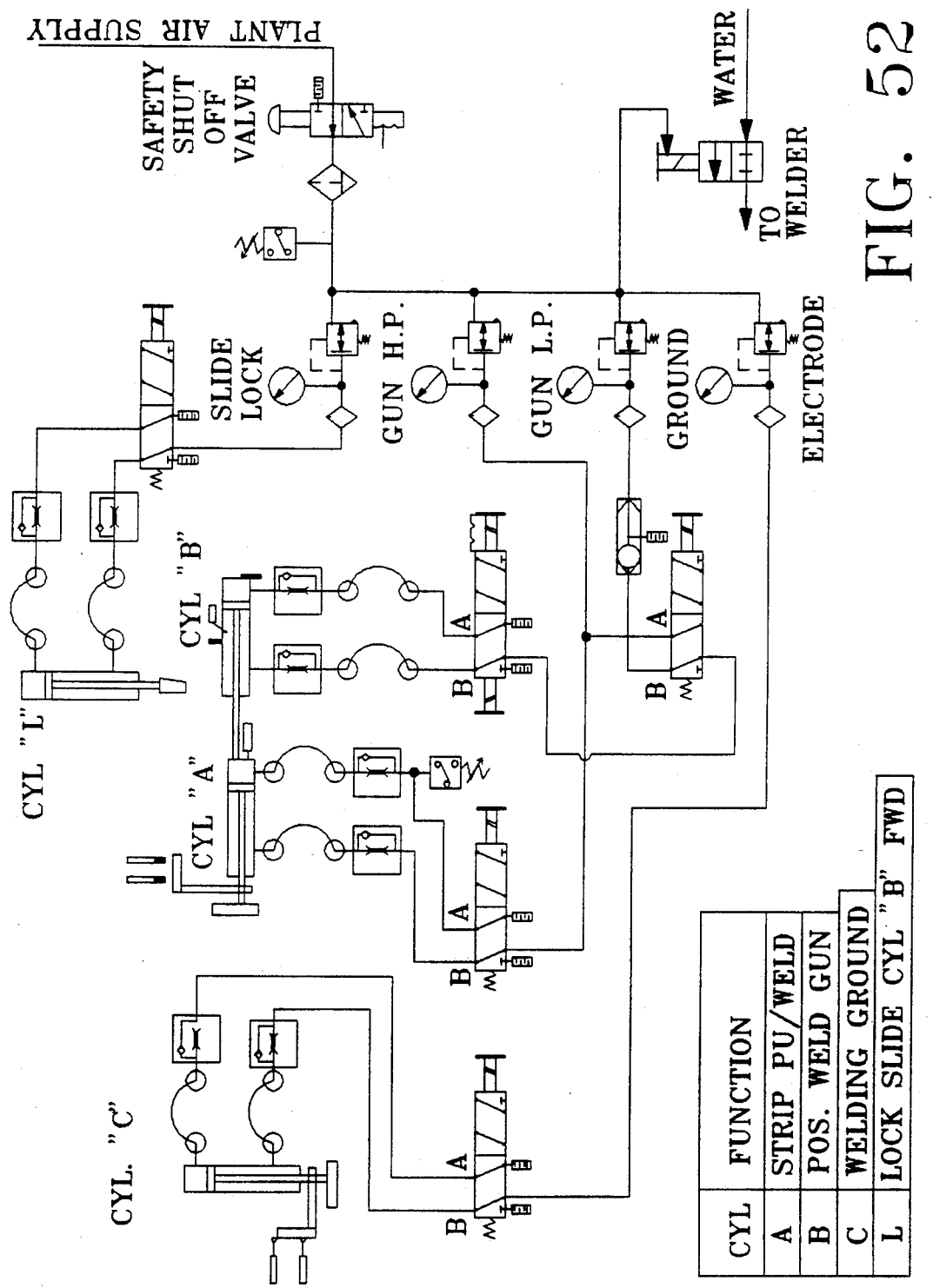
FIG. 52 is a schematic diagram of a pneumatic system employed in the present invention.

In FIG. 2, the dotted line represents electrode displacement where delayed penetration has occurred in a vane weld and a good weld resulted because displacement was within the required specifications. The elongated dashed line demonstrates a weld in which delayed penetration occurred and the displacement was under the limit required for a good weld. The triple dash phantom line designates an edge weld which did not properly join the balance strip to the turbine. The double dash phantom line represents a good vane weld occurring under the desired specifications. The single dash phantom line demonstrates the displacement of a good weld with explusion, thus designating a part which must be cleaned of the explusion material before further production continues. The short dashed lines indicate a good weld occurring where delayed penetration has occurred. The solid line designates a typical good weld.

Having thus described the present invention, many modifications thereto will become apparent to those skilled in the art to which it pertains without departing from the scope and spirit of the present invention as defined in the appended claims.

What is claimed is:

1. A spot welder for joining a plurality of parts, said spot welder comprising:
   an electrode electrically coupled to a weld controller;
   a first cylinder assembly having a cylinder housing, a piston and piston rod attached thereto for linearly displacing said electrode;
   a linear variable displacement transducer (LVDT) for detecting the displacement of said piston rod relative to the first cylinder housing and generating a LVDT signal responsive thereto;
   a microprocessor controlled monitor cooperating with the weld controller for evaluating the LVDT signal occurring during each cylinder movement to determine proper part fit up and to compensate for electrode wear prior to the initiation of welding, for monitoring real time displacement of the electrode as a result of welding, in order to cooperate with the weld controller to vary weld duration responsive to the electrode displacement; and
   a second cylinder assembly for linearly displacing said first cylinder assembly between a retracted position to facilitate part removal and an extended position in which welding occurs.

2. The invention according to claim 1 wherein said microprocessor controlled monitor provides a cylinder retract signal to verify that the first cylinder assembly has retracted the electrode prior to the removal of a part from the welder.

3. The invention according to claim 1 wherein said LVDT is aligned axially with the first piston rod.

4. The invention according to claim 1 further comprising a means for limiting off axis moments with respect to the axis of said second cylinder assembly comprising at least one guide rail.

5. The invention according to claim 1 further comprising means for monitoring weld expulsion based upon electrode displacement.

6. The invention according to claim 1 further comprising diagnostic means for determining the amount of electrode wear based upon the LVDT signal.

7. A method of forming a resistance spot weld comprising:
   providing a spot welder having an electrode electrically coupled to a weld controller;
   supporting said electrode on the piston rod of a first cylinder assembly for linear displacement along an electrode axis;
   displacing said first cylinder assembly linearly between a retracted position and an extended position by utilizing a second cylinder assembly;

monitoring the relative displacement between the piston rod and first cylinder assembly using a linear variable displacement transducer (LVDT) and creating a LVDT signal responsive to relative movement therebetween;

determining whether proper part fit up is achieved prior to the initiation of welding by monitoring the LVDT signal utilizing a microprocessor controlled monitor which is coupled to the weld controller;

compensating for electrode wear prior to the initiation of welding by monitoring the LVDT signal utilizing said microprocessor controlled monitor;

initiating welding;

varying weld duration by monitoring electrode movement which occurs as a result of welding; and identifying good and bad welds by monitoring electrode movement which occurs as a result of welding.

8. The method according to claim 7 further comprising the steps of:

pressurizing the first cylinder assembly after the completion of a weld so as to retract the electrode; and signalling a fault condition if the electrode has not retracted after the first cylinder assembly is pressurized.

9. The method according to claim 7 further comprising the step of determining weld explusion by monitoring electrode movement which occurs as a result of welding.

10. The method according to claim 7 wherein the step of supporting the electrode further comprises limiting off axis moments with respect to the axis of said second cylinder assembly.

11. The method according to claim 7 wherein the step of supporting the electrode further comprises resisting rotary moments about the axis of said second cylinder.

12. The method according to claim 7 further comprising the step of determining the amount of electrode wear based upon the LVDT signal.

13. A method of forming a resistance spot weld comprising:

providing a spot welder having an electrode electrically coupled to a weld controller;

supporting said electrode by the piston rod of a first cylinder assembly for linear displacement along an electrode axis;

displacing said first cylinder assembly linearly between a retracted position and an extended position by means of a second cylinder assembly;

monitoring the relative displacement between the piston rod and first cylinder assembly using a linear variable displacement transducer (LVDT) and creating a LVDT signal responsive to relative movement therebetween;

determining whether proper part fit up is achieved prior to the initiation of welding by monitoring the LVDT signal utilizing a microprocessor controlled monitor which is coupled to the weld controller;

compensating for electrode wear prior to the initiation of welding by monitoring the LVDT signal utilizing said microprocessor controlled monitor;

initiating welding;

varying weld duration by monitoring electrode movement which occurs as a result of welding;

identifying good and bad welds by monitoring electrode movement which occurs as a result of welding;

determining weld expulsion by monitoring electrode movement which occurs as a result of welding;

pressurizing the first cylinder assembly after the completion of a weld so as to retract the electrode;

signalling a fault condition if the electrode has not retracted after the first cylinder assembly is pressurized; and determining the amount of electrode wear based upon the LVDT signal.

* * * * *

UNITED STATES PATENT AND TRADEMARK OFFICE
CERTIFICATE OF CORRECTION

PATENT NO. : 5,220,145
DATED : June 15, 1993
INVENTOR(S) : Dimitrios G. Cecil et al.

It is certified that error appears in the above-identified patent and that said Letters Patent is hereby corrected as shown below:

Column 7, line 34, claim 11, after "claim delete "7" and insert --10--.

Signed and Sealed this

Seventeenth Day of May, 1994

Attest:

BRUCE LEHMAN

*Attesting Officer*    *Commissioner of Patents and Trademarks*